US008982476B2

(12) United States Patent
Maetaki

(10) Patent No.: US 8,982,476 B2
(45) Date of Patent: Mar. 17, 2015

(54) ZOOM LENS AND IMAGE PICKUP APPARATUS HAVING THE SAME

(71) Applicant: Canon Kabushiki Kaisha, Tokyo (JP)

(72) Inventor: Satoshi Maetaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/950,634

(22) Filed: Jul. 25, 2013

(65) Prior Publication Data

US 2014/0029109 A1   Jan. 30, 2014

(30) Foreign Application Priority Data

Jul. 30, 2012 (JP) ................... 2012-168253

(51) Int. Cl.
*G02B 15/14* (2006.01)
*G02B 15/177* (2006.01)

(52) U.S. Cl.
CPC .............. *G02B 15/14* (2013.01); *G02B 15/177* (2013.01)
USPC ............................ 359/684; 359/680; 359/683

(58) Field of Classification Search
CPC ............................... G02B 15/177; G02B 15/14
USPC .......................... 359/680, 681, 682, 683, 684
See application file for complete search history.

(56) References Cited

U.S. PATENT DOCUMENTS

| | | | |
|---|---|---|---|
| 7,777,967 B2 | 8/2010 | Hirakawa | |
| 2006/0056043 A1 | 3/2006 | Nakazawa et al. | |
| 2010/0195216 A1 | 8/2010 | Miyazaki et al. | |
| 2011/0109978 A1 | 5/2011 | Yamada et al. | |
| 2011/0128416 A1 | 6/2011 | Satori et al. | |
| 2012/0019928 A1 | 1/2012 | Sato | |
| 2012/0050602 A1 | 3/2012 | Imaoka et al. | |

FOREIGN PATENT DOCUMENTS

| | | |
|---|---|---|
| JP | 07-306362 A | 11/1995 |
| JP | 2001-343584 A | 12/2001 |
| JP | 2006-058584 A | 3/2006 |
| JP | 2008-197176 A | 8/2008 |

(Continued)

OTHER PUBLICATIONS

NPL English Translation of JP2012027262A (IPDL computer translation, Aug. 12, 2014).*

(Continued)

*Primary Examiner* — David N Spector
(74) *Attorney, Agent, or Firm* — Carter, DeLuca, Farrell & Schmidt, LLP

(57) ABSTRACT

A zoom lens includes, in order from an object side to an image side, a first lens unit having a negative refractive power, a second lens unit having a positive refractive power, a focus lens unit having a negative refractive power, configured to move in focusing, and a final lens unit having a positive refractive power, disposed closest to the image side. The focus lens unit and the final lens unit are disposed so as to be adjacent to each other, each lens unit moves so that a distance between adjacent lens units changes in zooming, and a focal length of the final lens unit $f_{img}$, a focal length of the focus lens unit $f_f$, and a focal length of an entire system at a wide-angle end $f_w$ are appropriately set.

10 Claims, 13 Drawing Sheets

(56) References Cited

FOREIGN PATENT DOCUMENTS

| | | |
|---|---|---|
| JP | 2009-186983 A | 8/2009 |
| JP | 2010-176096 A | 8/2010 |
| JP | 2012-027262 A | 2/2012 |

OTHER PUBLICATIONS

Extended European Search Report issued in corresponding application No. 13178330.0 on Feb. 3, 2014.
Partial European Search Report issued in corresponding application No. 13178330.0 on Oct. 15, 2013.

* cited by examiner

ZOOM LENS AND IMAGE PICKUP APPARATUS HAVING THE SAME

BACKGROUND OF THE INVENTION

1. Field of the Invention

The present invention relates to a zoom lens, and is suitably used for an image pickup apparatus such as a digital camera, a video camera, a TV camera, a monitoring camera, or a silver-salt film camera.

2. Description of the Related Art

As a negative lead type zoom lens in which a lens unit having a negative refractive power is disposed at an object side, a four-unit zoom lens that includes, in order from the object side to an image side, lens units having negative, positive, negative, and positive refractive powers, and that changes a distance between adjacent lens units so as to perform zooming is known (Japanese Patent Laid-Open No. 2006-58584, U.S. Pat. No. 7,777,967, and Japanese Patent Laid-Open No. 2001-343584).

In addition, a five-unit zoom lens that includes, in order from the object side to the image side, first to fifth lens units having negative, positive, positive, negative, and positive refractive powers, and that moves each lens unit so that a distance between adjacent lens units changes in zooming is known (Japanese Patent Laid-Open No. H07-306362).

In these zoom lenses, various focusing methods are used. In Japanese Patent Laid-Open No. 2006-58584, a first lens unit includes, in order from the object side to the image side, a first lens subunit having a negative refractive power and a second lens subunit having a negative refractive power, and the second lens subunit moves in focusing. In U.S. Pat. No. 7,777,967, a fourth lens unit moves in focusing. In Japanese Patent Laid-Open No. 2001-343584, a third lens unit moves in focusing. In Japanese Patent Laid-Open No. H07-306362, a second lens unit moves in focusing.

In the negative lead type zoom lens, it is relatively easy to widen an angle of field, and there are characteristics that a long back focus can be easily obtained. However, a lens configuration is asymmetric with respect to an aperture stop, and therefore it is difficult to correct various aberrations and for example a large amount of aberration variation is generated in focusing, and thus it is difficult to obtain a high optical performance.

Particularly, in order to perform high speed focusing, the aberration variation in focusing tends to be increased in an inner focus method of performing the focusing by a small and lightweight lens unit disposed at the image side relative to the first lens unit.

In order to widen the angle of field, reduce a whole of a lens system, and perform the high speed focusing by using a small and lightweight lens unit, it is important to appropriately set a refractive power (a power) of each lens unit, a lens configuration, or the like.

SUMMARY OF THE INVENTION

The present invention provides a zoom lens with a wide angle of field that is capable of easily performing high speed focusing.

A zoom lens as one aspect of the present invention includes, in order from an object side to an image side, a first lens unit having a negative refractive power, a second lens unit having a positive refractive power, a focus lens unit having a negative refractive power, configured to move in focusing, and a final lens unit having a positive refractive power, disposed closest to the image side. The focus lens unit and the final lens unit are disposed so as to be adjacent to each other, each lens unit moves so that a distance between adjacent lens units changes in zooming, and the following conditional expressions are satisfied.

$$1.8 < |f_{img}/f_f| < 10.0$$

$$5.0 < f_{img}/f_w < 40.0$$

In the expressions, $f_{img}$ is a focal length of the final lens unit, $f_f$ is a focal length of the focus lens unit, and $f_w$ is a focal length of an entire system at a wide-angle end.

An image pickup apparatus as another aspect of the present invention includes the zoom lens and an image pickup element configured to receive light of an image formed by the zoom lens.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Hereinafter, a zoom lens and an image pickup apparatus having the zoom lens of the present invention will be described. The zoom lens of the present invention includes, in order from an object side to an image side, a first lens unit having a negative refractive power, a second lens unit having a positive refractive power, and a focus lens unit having a negative refractive power which moves in focusing, and a final lens unit having a positive refractive power which is disposed closest to the image side. The focus lens unit is disposed at a position adjacent to the object side of the final lens unit.

Figure 13:
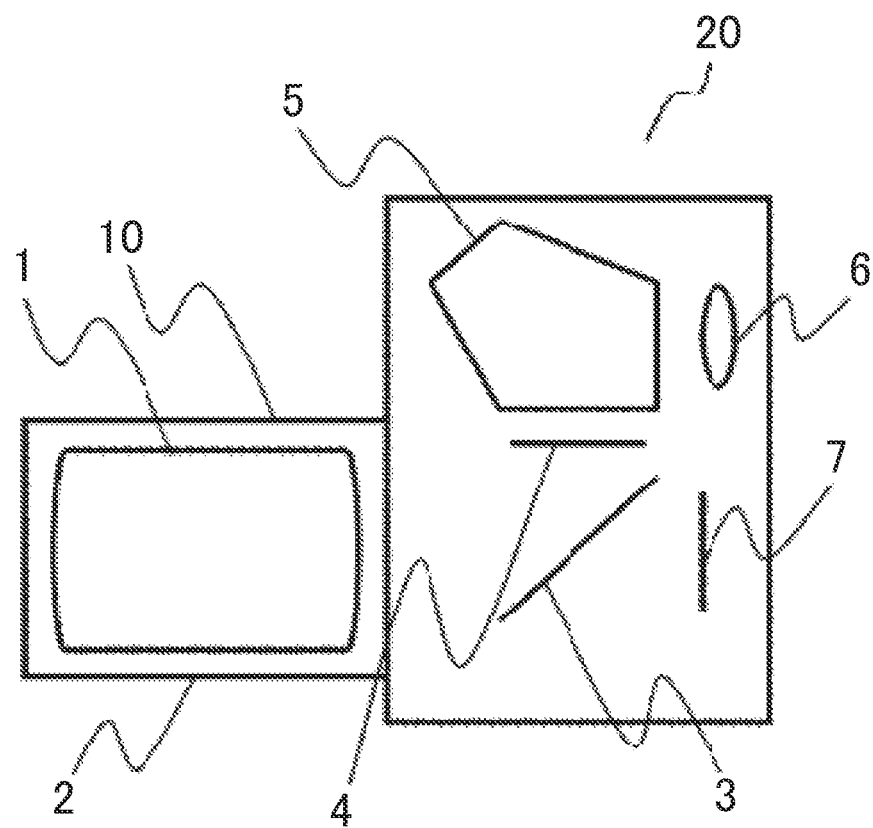
FIG. 13 is a schematic diagram of a main part of an image pickup apparatus of the present invention.

FIGS. 1, 3, 5, 7, 9, and 11 are cross-sectional diagrams of lenses at a wide-angle end of Embodiments 1 to 6 of the present invention, respectively. FIGS. 2A, 2B, 4A, 4B, 6A, 6B, 8A, 8B, 10A, 10B, 12A, and 12B are vertical aberration diagrams of Embodiments 1 to 6 of the present invention, respectively. In the aberration diagrams, FIGS. 2A, 4A, 6A, 8A, 10A, and 12A are vertical aberration diagrams of the lenses at a wide-angle end when focusing on an object at infinity, and FIGS. 2B, 4B, 6B, 8B, 10B, and 12B are vertical aberration diagrams of the lenses at a telephoto end when focusing on the object at infinity. FIG. 13 is a schematic diagram of a main part of a camera (an image pickup apparatus) including the zoom lens of each embodiment. The zoom lens of each embodiment is an image pickup lens system that is used for the image pickup apparatus such as a video camera, a digital camera, or a silver-salt film camera.

In the cross-sectional diagrams of the lenses, the left is an object side (a front side) and the right is an image side (a rear side). Additionally, in the cross-sectional diagrams of the lenses, symbol OL denotes a zoom lens. Symbol Li denotes an i-th lens unit where symbol i is an order of the lens unit from the object side. Symbol $L_f$ denotes a focus lens unit, and symbol $L_{img}$ denotes a final lens unit. Symbol SP denotes an aperture stop.

Symbol IP denotes an image plane. The image plane IP corresponds to an imaging plane of an image pickup element (a photoelectric conversion element) such as a CCD sensor or a CMOS sensor when the zoom lens is used as an image pickup optical system of the video camera, the digital camera, or the monitoring camera. The image plane IP corresponds to a film surface when the zoom lens is used as an image pickup optical system of the silver-salt film camera. Symbol OA denotes an optical axis. In each of the following embodiments, the wide-angle end and the telephoto end are positions where a magnification-varying lens unit is mechanically located at both ends of a movable range on an optical axis. In the cross-sectional diagrams of the lenses, an arrow indicates a moving locus of each lens unit when zooming is performed from the wide-angle end to the telephoto end.

In the aberration diagrams, d (solid line), g (dashed-two dotted line), C (dashed-dotted line), and F (dashed line) indicate d-line, g-line, C-line, and F-line, respectively. Symbol ΔM and ΔS indicate a meridional image plane and a sagittal image plane, respectively. Distortion is indicated by the d-line. Symbol Fno denotes an F-number, and symbol ω denotes a half angle of field (degree).

The zoom lens OL of each embodiment includes, in order from the object side to the image side, a first lens unit L1 having a negative refractive power and a second lens unit L2 having a positive refractive power. The zoom lens OL further includes a final lens unit $L_{img}$ having a positive refractive power, disposed closest to the image side, and a focus lens unit $L_f$ having a negative refractive power that moves on the optical axis in focusing at the object side of the final lens unit $L_{img}$. A focal length of the final lens unit $L_{img}$ is denoted by $f_{img}$, a focal length of the focus lens unit $L_f$ is denoted by $f_f$, and a focal length of an entire system at the wide-angle end is denoted by $f_w$. In this case, the following Conditional Expressions (1) and (2) are satisfied.

$$1.8 < |f_{img}/f_f| < 10.0 \tag{1}$$

$$5.0 < f_{img}/f_w < 40.0 \tag{2}$$

Next, technical meanings of Conditional Expressions (1) and (2) described above will be described. Conditional Expression (1) relates to a ratio of the focal length of the final lens unit $L_{img}$ disposed closest to the image side and a focal length of the focus lens unit $L_f$ disposed adjacent to its object side.

When a value is under the lower limit of Conditional Expression (1) so that the focal length of the final lens unit $L_{img}$ is relatively smaller than an absolute value of the focal length of the focus lens unit $L_f$, the positive refractive power of the final lens unit $L_{img}$ becomes strong. In this case, a tendency of a retro focus type is strengthened as a whole of the zoom lens, a large amount of various aberrations are generated, especially field curvature is increased, and therefore this correction is difficult. Or, the absolute value of the focal length of the focus lens unit $L_f$ is increased, the refractive power of the focus lens unit $L_f$ is weakened, an amount of drive in focusing is increased, and therefore it is not preferable.

On the contrary, when the value exceeds the upper limit of Conditional Expression (1) so that the focal length of the final lens unit $L_{img}$ is increased and the positive refractive power is weakened, it is difficult to ensure a backfocus of a predetermined length. Or, when the absolute value of the focal length of the focus lens unit $L_f$ is decreased and the negative refractive power is strengthened, variability of the aberration is increased in focusing.

Conditional Expression (2) is normalized by dividing the focal length of the final lens unit $L_{img}$ disposed closest to the image side by the focal length of the entire system. When a value is under the lower limit of Conditional Expression (2), the focal length of the final lens unit $L_{img}$ is shortened and the positive refractive power is strengthened. In this case, it is easy to ensure the backfocus having the predetermined length as a whole of the zoom lens, but it is necessary to strengthen the refractive power of the lens unit having the negative refractive power at the object side.

Then, a tendency of the optical arrangement of the retro focus type is strengthened, various aberrations such as a spherical aberration, coma aberration, field curvature, or distortion are increased, particularly characteristics of the image plane are increased, and its correction is difficult. Furthermore, when the back focus is elongated, the total length of the zoom lens is increased and therefore it is not preferable. On the contrary, when the value exceeds the upper limit of Conditional Expression (2), the focal length of the final lens unit $L_{img}$ is elongated, and the positive refractive power is weakened. In this case, the back focus is so short that it is difficult to arrange an image pickup element, a filter, or the like.

As described above, Conditional Expressions (1) and (2) are conditional expressions which are needed to appropriately correct various aberrations while keeping the entire system small. In addition, they are necessary to sufficiently ensure the back focus, reduce the drive amount of the focus lens unit, and reduce aberration variation in focusing. It is preferred that numerical ranges of Conditional Expressions (1) and (2) are set as follows.

$$2.0 < |f_{img}/f_f| < 9.0 \tag{1a}$$

$$6.0 < f_{img}/f_w < 30.0 \tag{2a}$$

It is more preferred that numerical ranges of Conditional Expressions (1a) and (2a) are set as follows.

$$2.2 < |f_{img}/f_f| < 8.0 \tag{1b}$$

$$7.0 < f_{img}/f_w < 26.0 \tag{2b}$$

In the zoom lens of the present invention, it is more preferred that at least one of the following conditional expressions are satisfied. In the conditional expression, the back focus at the wide-angle end is denoted by $BF_w$.

$$-4.0 < f_f/f_w < 0.0 \tag{3}$$

$$BF_w/f_w < 1.5 \tag{4}$$

The zoom lens of the present invention arranges the focus lens unit near the final lens unit where a ray passes through a low height so as to reduce a size of the focus lens unit and facilitate high speed focusing. A change of an image magnification caused by the focusing is suppressed in addition to the reduction of the focus drive amount and the adoption of an appropriate power arrangement.

Conditional Expression (3) is normalized by dividing the focal length $f_f$ of the focus lens unit $L_f$ in this case by the focal length of the entire system at the wide-angle end. When a value is under the lower limit of Conditional Expression (3), an absolute value of the focal length of the focus lens unit $L_f$ is increased, and the negative refractive power is weakened. In this case, the focus sensitivity of the focus lens unit $L_f$ is decreased and a moving amount in focusing is increased, and therefore it is difficult to perform the high speed focusing. In addition, a space corresponding to the moving amount of the focus lens unit $L_f$ needs to be ensured in the zoom lens, and therefore the size of the entire system is increased.

On the contrary, when the value exceeds the upper limit of Conditional Expression (3), the focal length of the focus lens unit $L_f$ becomes a positive value and it is difficult to correct the aberration variation caused by the focusing. It is preferred that Conditional Expression (3) is set to the following range.

$$-4.0 < f_f/f_w < -1.0 \tag{3a}$$

It is more preferred that Conditional Expression (3) is set to the following range.

$$-3.8 < f_f/f_w < -1.5 \tag{3b}$$

Conditional Expression (4) is normalized by dividing the back focus $BF_w$ at the wide-angle end by the focal length at the wide angle end. When a value exceeds the upper limit of Conditional Expression (4), the back focus is elongated, and therefore the size of the zoom lens is increased. It is preferred that Conditional Expression (4) is set to the following range.

$$0.7 < BF_w/f_w < 1.5 \tag{4a}$$

It is more preferred that Conditional Expression (4a) is set to the following range.

$$0.80 < BF_w/f_w < 1.46 \tag{4b}$$

When the zoom lens of each embodiment is applied to an image pickup apparatus having the image pickup element, it is preferred that the following conditional expression is satisfied. In the following conditional expression, a maximum image height of an image that is formed on the image pickup element is denoted by $Y_{max}$ (mm). In this case, it is preferred that the following Conditional Expression (5) is satisfied.

$$BF_w/Y_{max} < 1.6 \tag{5}$$

Conditional Expression (5) is a ratio of the back focus and the maximum image height at the wide-angle end when the zoom lens of the present invention is used for the image pickup apparatus. When a value exceeds the upper limit of Conditional Expression (5), the back focus is relatively elongated, and therefore the size of the zoom lens is increased. In addition, an exit pupil distance tends to be elongated, and therefore the power arrangement of the retro focus type is strengthened so that the various aberrations, in particular the field curvature, are deteriorated. It is more preferred that Conditional Expression (5) is set to the following range.

$$0.7 < BF_w/Y_{max} < 1.5 \tag{5a}$$

It is further preferred that Conditional Expression (5a) is set to the following range.

$$0.75 < BF_w/Y_{max} < 1.46 \tag{5b}$$

In the present invention, it is preferred that the focus lens unit $L_f$ consists of one lens. In order to perform the high speed focusing, a weight of the focus lens unit $L_f$ needs to be extremely light. Therefore, it is preferred that the focus lens unit $L_f$ consists of one lens.

The focus lens unit $L_f$ is configured by a negative lens having a meniscus shape concave towards the image side. The focus lens unit $L_f$ moves to the image side on the optical axis when the focusing on the object at infinity to an object at a short distance is performed. In this case, a change of an incident height at which an on-axis light beam passes through the focus lens unit is considered. When a case where a surface of the focus lens unit $L_f$ at the object side has a convex shape towards the object side is compared to a case where the surface has a concave shape towards the object side, an amount of the change of the incident height at which the on-axis light beam passes through the focus lens unit in moving the focus lens unit $L_f$ is smaller when the case where the surface has the convex shape towards the object side. The same is applied to a surface of the focus lens unit $L_f$ at the image side.

If the change of the incident height of the ray passing through the focus lens unit $L_f$ is small, the aberration variation can also be reduced. Accordingly, it is preferred that the focus lens unit $L_f$ is a negative lens having a meniscus shape where both the surfaces at the object side and the image side are convex towards the object side (both the surfaces are concave towards the image side). Using the focus lens unit $L_f$ that is the negative lens having the meniscus shape concave towards the image side, it is easy to reduce the aberration variation, particularly variation of the spherical aberration, caused by the focusing.

Embodiment 1

Figure 1:
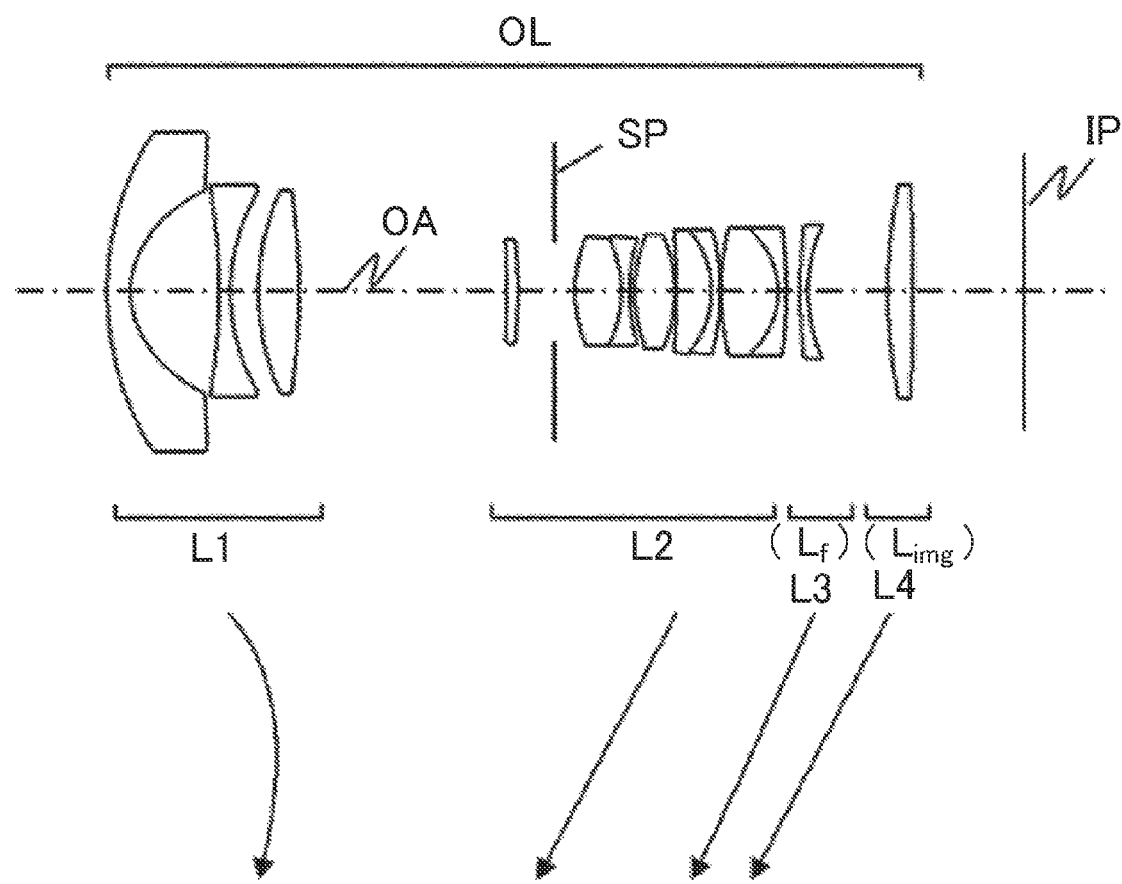
FIG. 1 is a cross-sectional diagram of lenses of a zoom lens at a wide-angle end in Embodiment 1.
Figure 2A:
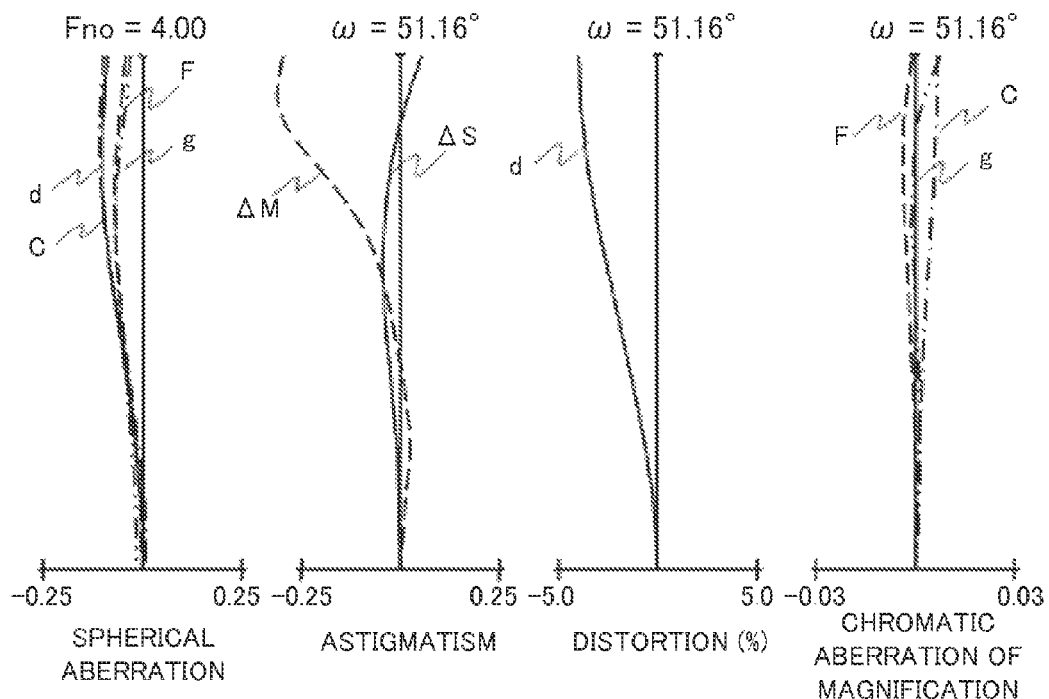
FIGS. 2A and 2B are vertical aberration diagrams of the zoom lens when focusing on an object at infinity in Embodiment 1.
Figure 2B:
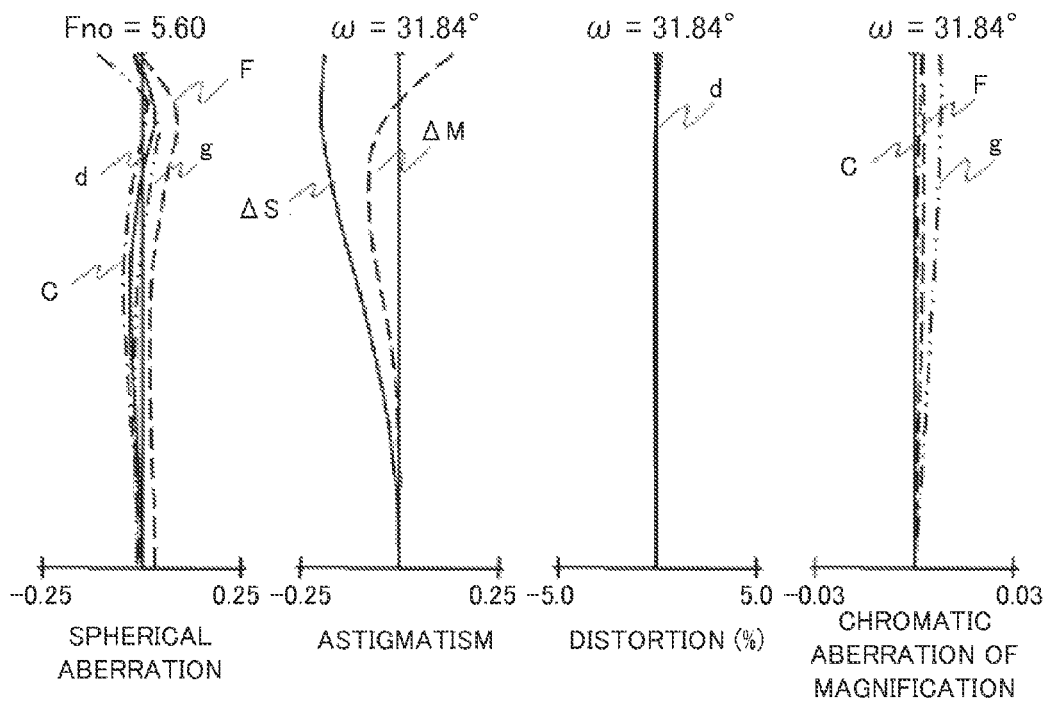

Hereinafter, referring to FIG. 1, a zoom lens OL of Embodiment 1 of the present invention will be described. The zoom lens OL of Embodiment 1 is a zoom lens with a wide angle of field having a focal length of 11.0 mm to 22.0 mm (a shooting angle of field of 102.3 to 63.7 degrees). The zoom lens OL is configured by a first lens unit L1 having a negative refractive power, a second lens unit L2 having a positive refractive power, a third lens unit L3 having a negative refractive power, and a fourth lens unit L4 having a positive refractive power.

In this zoom lens OL, the fourth lens unit L4 is the final lens unit ($L_{img}$). The third lens unit L3 is the focus lens unit ($L_f$) that moves to the image side along the optical axis in focusing on the object at infinity to the object at the short distance. This focus lens unit ($L_f$) is configured by a negative lens having a meniscus shape concave towards the image side. The focal length of the entire system at the wide-angle end is 11.0 mm. The focal lengths of the third lens unit L3 and the fourth lens unit L4 are −26.77 mm and 93.12 mm, respectively.

In the present embodiment, an absolute value of a ratio of the focal lengths of the fourth lens unit L4 and the third lens unit L3 indicated by Conditional Expression (1) is 3.48, and a value that is obtained by normalizing the focal lengths of the fourth lens unit L4 and the entire system indicated by Conditional Expression (2) is 8.47.

The zoom lens of Embodiment 1 achieves a zoom lens with a wide angle of field where the power arrangement as described above is provided and an angle of field 2ω is 102.3 degrees at the wide-angle end. Providing such power arrangements, as can be seen from FIGS. 2A and 2B, various aberrations such as a spherical aberration, a coma aberration, field curvature, and distortion are appropriately corrected without strengthening the power arrangement of the retro focus type too much.

In addition, disposing the third lens unit L3 for the focusing adjacent to the final lens unit, instead of disposing it at the object side of the zoom lens OL, an effective diameter of this lens unit is reduced around 12 mm, and thus the weight is further reduced. According to the position of the third lens unit L3 and the appropriate power arrangement, the change of the image magnification caused by the focusing can also be suppressed. As a result, a longest total lens length is small of 90.36 mm (the telephoto end) and also the change of the image magnification caused by the focusing is small, and thus high speed focusing can be easily performed since the third lens unit L3 is small and lightweight.

Embodiment 2

Figure 3:
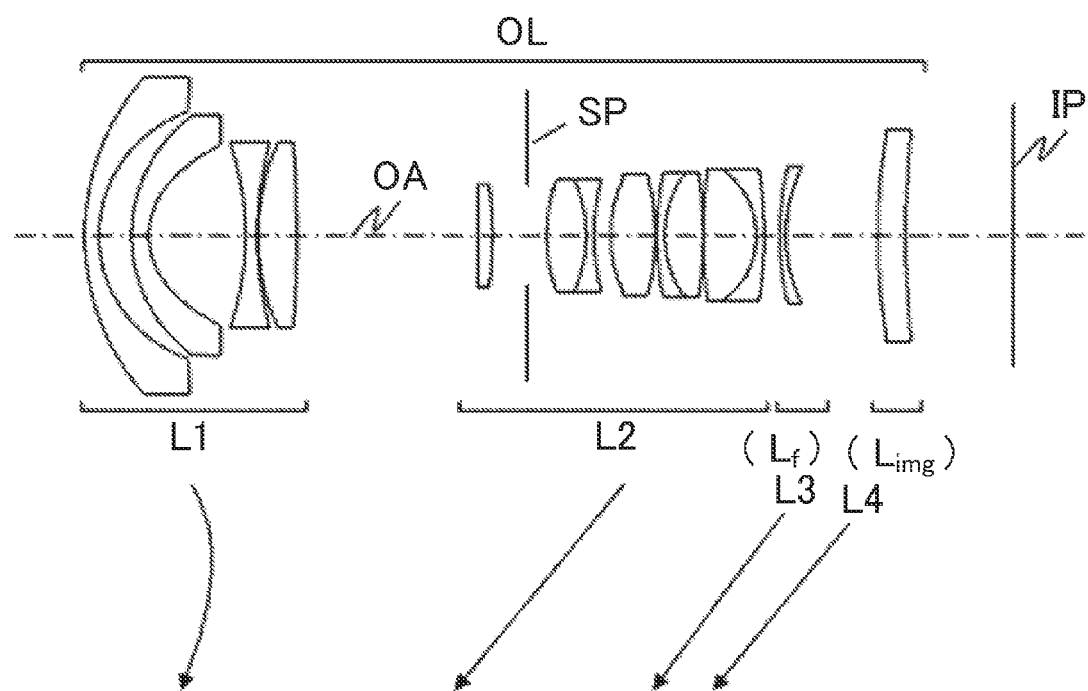
FIG. 3 is a cross-sectional diagram of lenses of a zoom lens at a wide-angle end in Embodiment 2.
Figure 4A:
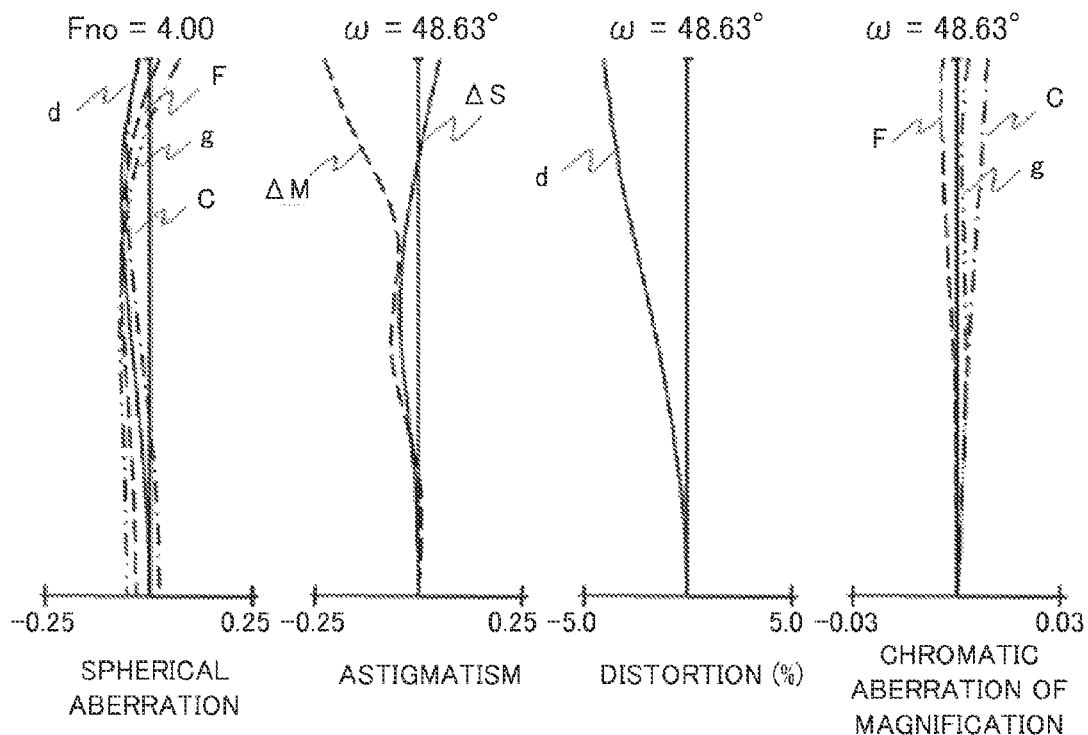
FIGS. 4A and 4B are vertical aberration diagrams of the zoom lens when focusing on an object at infinity in Embodiment 2.
Figure 4B:
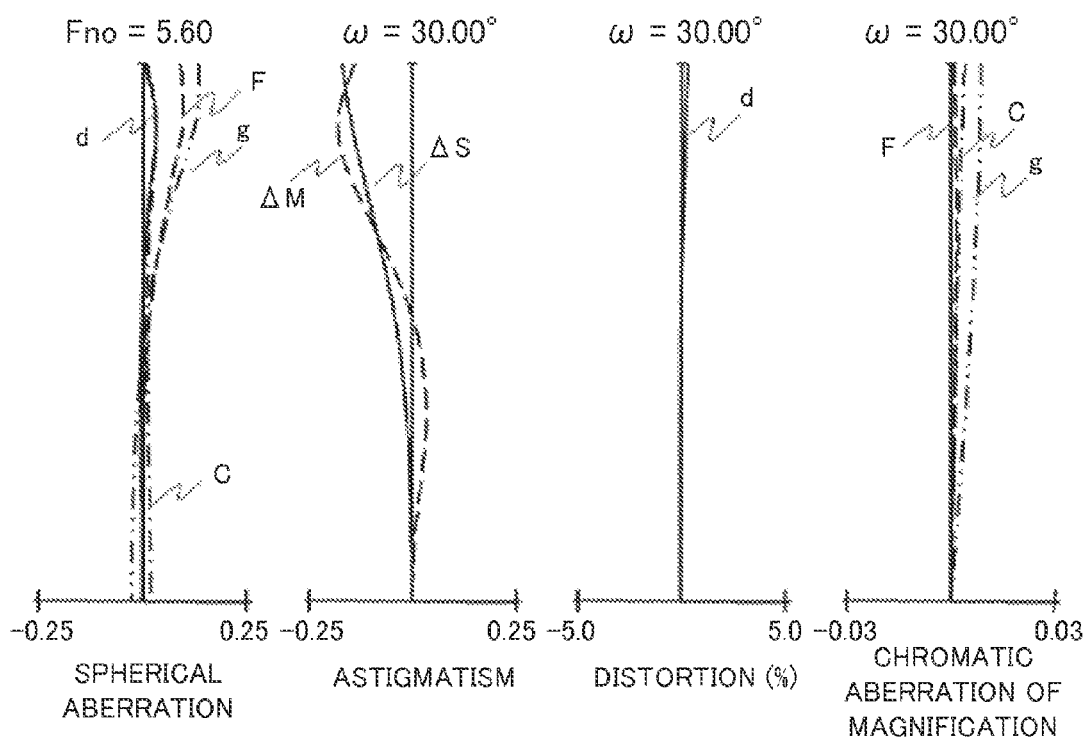

Hereinafter, referring to FIG. 3, a zoom lens OL of Embodiment 2 of the present invention will be described. The zoom lens OL of Embodiment 2 is a zoom lens with a wide angle of field having a focal length of 12.0 mm to 23.7 mm (a shooting angle of field of 97.3 to 60 degrees). A type of zooming of the zoom lens of Embodiment 2 is the same as that of Embodiment 1. The lens configuration of the third lens unit L3 for the focusing is also the same as that of Embodiment 1. The focal length of the entire system at the wide-angle end is 12.0 mm. The focal lengths of the third lens unit L3 and the fourth lens unit L4 are −40.45 mm and 308.10 mm, respectively.

In the present embodiment, the absolute value indicated by Conditional Expression (1) is 7.62, and the value indicated by Conditional Expression (2) is 25.61.

The zoom lens of Embodiment 2 achieves a zoom lens with a wide angle of field where the power arrangement as described above is provided and an angle of field 2ω is 97.3 degrees at the wide-angle end. Providing such power arrangements, as can be seen from FIGS. 4A and 4B, various aberrations such as a spherical aberration, a coma aberration, field curvature, and distortion are appropriately corrected without strengthening the power arrangement of the retro focus type too much. In addition, disposing the third lens unit L3 for the focusing adjacent to the final lens unit, instead of disposing it at the object side of the zoom lens OL, an effective diameter of this lens unit is reduced around 13 mm, and thus the weight is further reduced.

According to the position of the third lens unit L3 and the appropriate power arrangement, the change of the image magnification caused by the focusing can also be suppressed. As a result, a longest total lens length is small of 95.73 mm (the telephoto end) and also the change of the image magnification caused by the focusing is small, and thus high speed focusing can be easily performed since the third lens unit L3 is small and lightweight.

Embodiment 3

Figure 5:
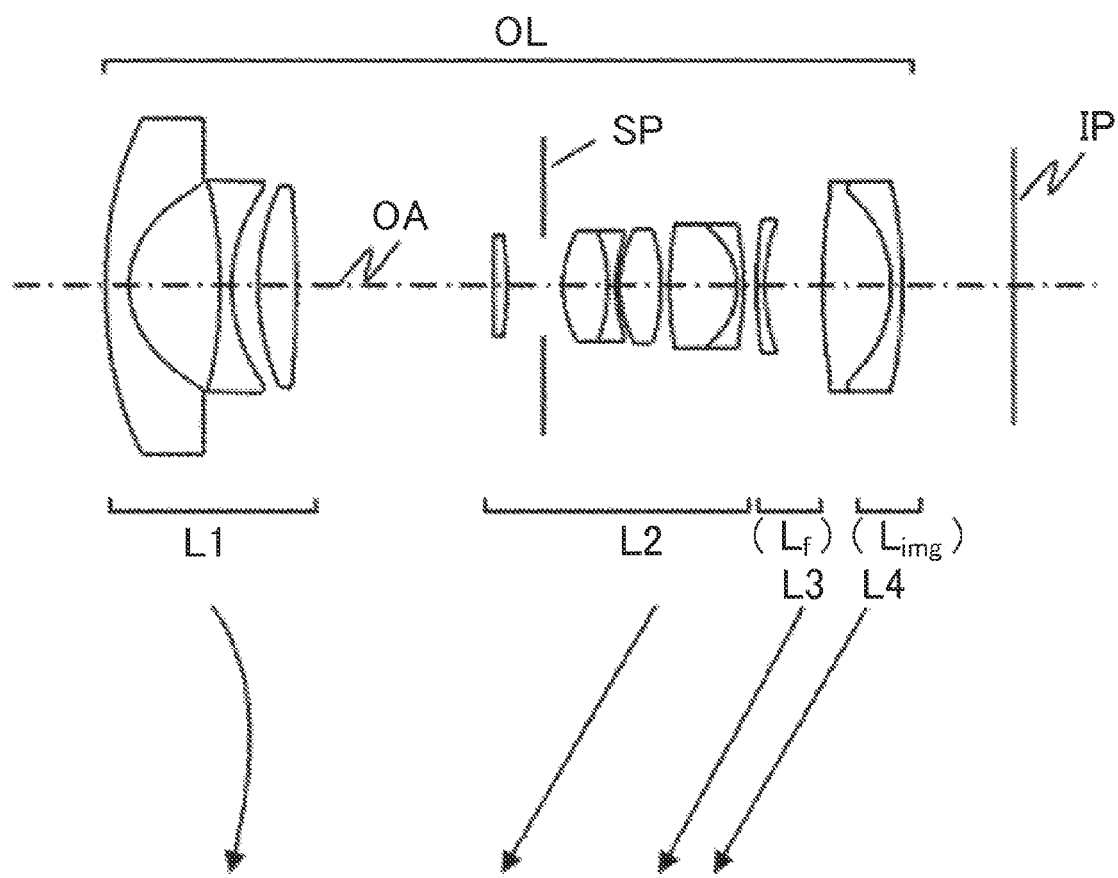
FIG. 5 is a cross-sectional diagram of lenses of a zoom lens at a wide-angle end in Embodiment 3.
Figure 6A:
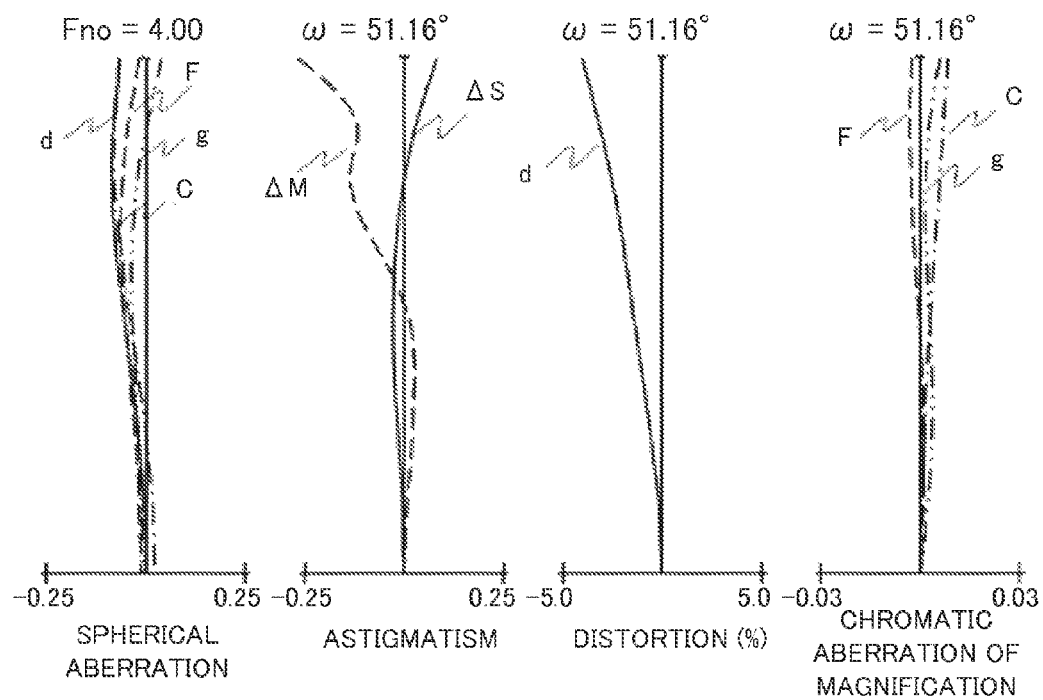
FIGS. 6A and 6B are vertical aberration diagrams of the zoom lens when focusing on an object at infinity in Embodiment 3.
Figure 6B:
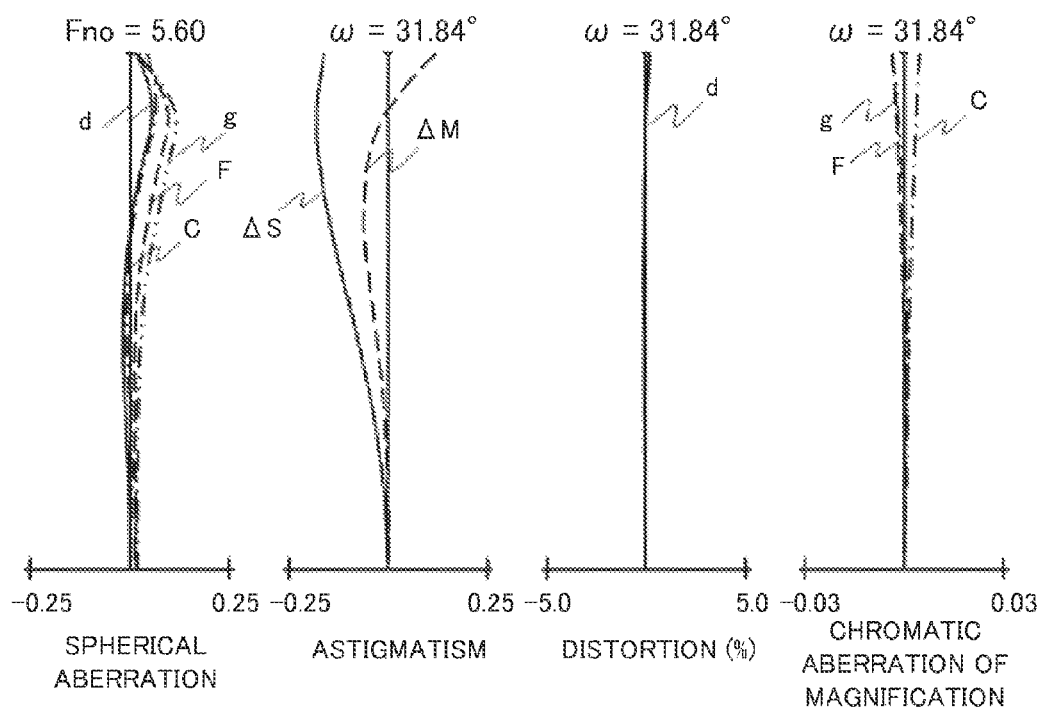

Hereinafter, referring to FIG. 5, a zoom lens OL of Embodiment 3 of the present invention will be described. The zoom lens OL of Embodiment 3 is a zoom lens with a wide angle of field having a focal length of 11.0 mm to 22.0 mm (a shooting angle of field of 102.3 to 63.7 degrees). A type of zooming of the zoom lens of Embodiment 3 is the same as that of Embodiment 1. The lens configuration of the third lens unit L3 for the focusing is also the same as that of Embodiment 1.

The focal length of the entire system at the wide-angle end is 11.0 mm. The focal lengths of the third lens unit L3 and the fourth lens unit L4 are −38.07 mm and 105.57 mm, respectively.

In the present embodiment, the absolute value indicated by Conditional Expression (1) is 2.77, and the value indicated by Conditional Expression (2) is 9.60. The zoom lens of Embodiment 3 achieves a zoom lens with a wide angle of field where the power arrangement as described above is provided and an angle of field 2ω is 102.3 degrees at the wide-angle end. Providing such power arrangements, as can be seen from FIGS. 6A and 6B, various aberrations such as a spherical aberration, a coma aberration, field curvature, and distortion are appropriately corrected without strengthening the power arrangement of the retro focus type too much.

In addition, disposing the third lens unit L3 for the focusing adjacent to the final lens unit, instead of disposing it at the object side of the zoom lens OL, an effective diameter of this lens unit is reduced around 12 mm, and thus the weight is further reduced. According to the position of the third lens unit L3 and the appropriate power arrangement, the change of the image magnification caused by the focusing can also be suppressed. As a result, a longest total lens length is small of 90.0 mm (the wide-angle end) and also the change of the image magnification caused by the focusing is small, and thus high speed focusing can be easily performed since the third lens unit L3 is small and lightweight.

Embodiment 4

Figure 7:
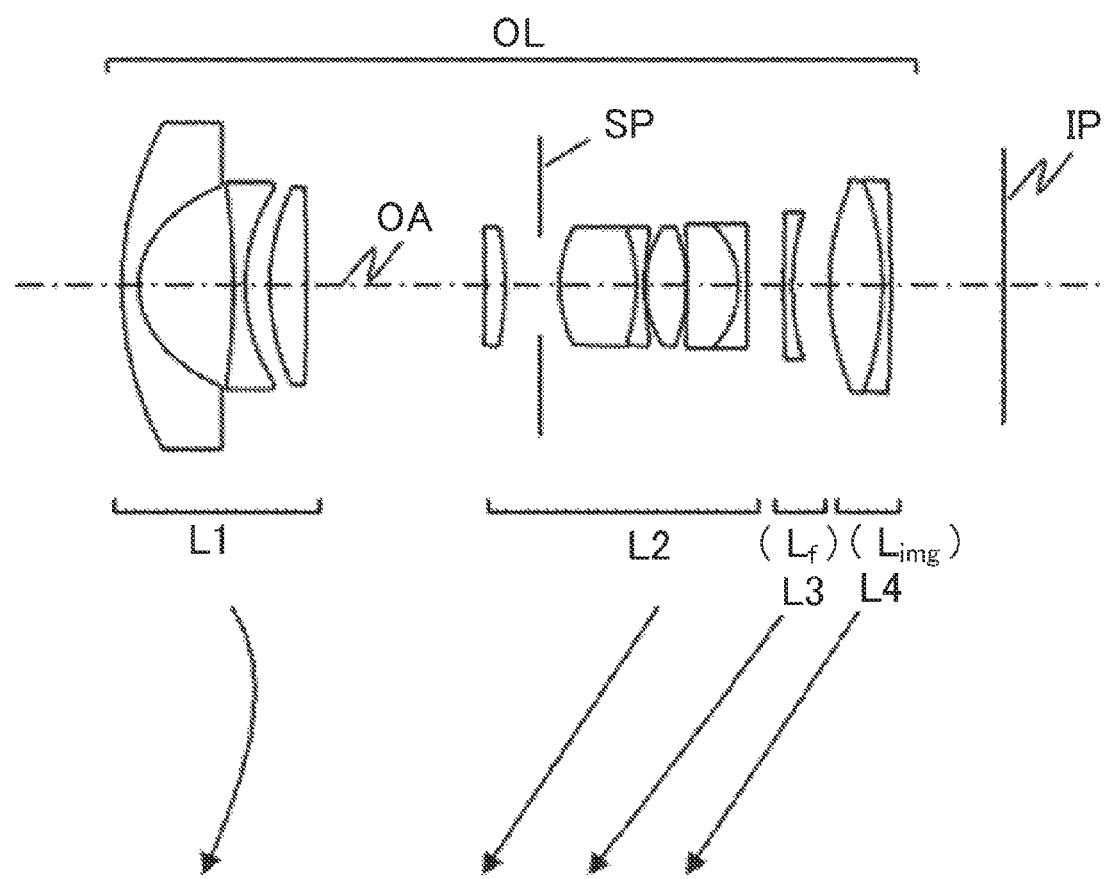
FIG. 7 is a cross-sectional diagram of lenses of a zoom lens at a wide-angle end in Embodiment 4.
Figure 8A:
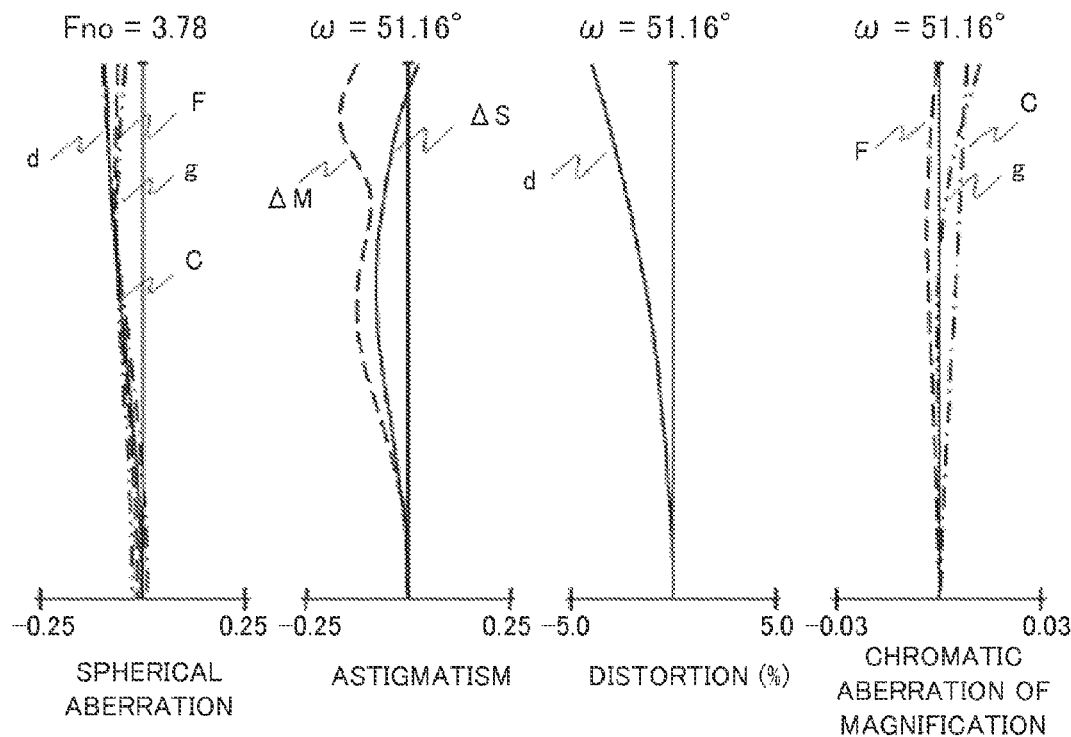
FIGS. 8A and 8B are vertical aberration diagrams of the zoom lens when focusing on an object at infinity in Embodiment 4.
Figure 8B:
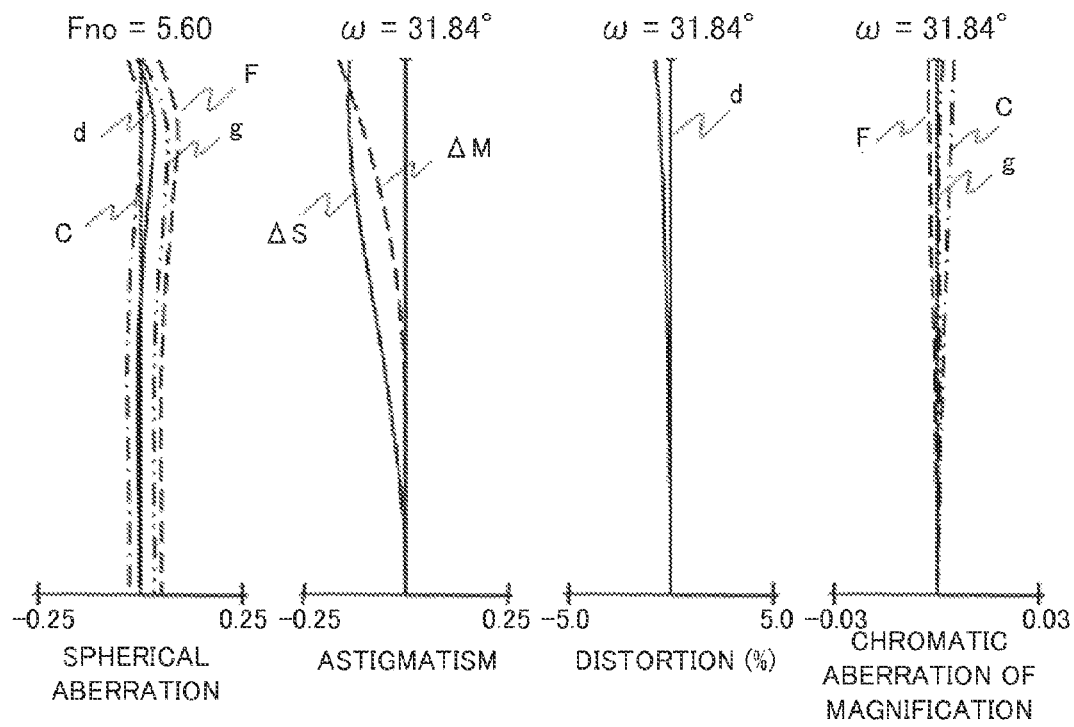

Hereinafter, referring to FIG. 7, a zoom lens OL of Embodiment 4 of the present invention will be described. The zoom lens OL of Embodiment 4 is a zoom lens with a wide angle of field having a focal length of 11.0 mm to 22.0 mm (a shooting angle of field of 102.3 to 63.7 degrees). A type of zooming of the zoom lens of Embodiment 4 is the same as that of Embodiment 1. The lens configuration of the third lens unit L3 for the focusing is also the same as that of Embodiment 1.

The focal length of the entire system at the wide-angle end is 11.0 mm. The focal lengths of the third lens unit L3 and the fourth lens unit L4 are −34.08 mm and 78.81 mm, respectively. In the present embodiment, the absolute value indicated by Conditional Expression (1) is 2.31, and the value indicated by Conditional Expression (2) is 7.16.

The zoom lens of Embodiment 4 achieves a zoom lens with a wide angle of field where the power arrangement as described above is provided and an angle of field 2ω is 102.3 degrees at the wide-angle end. Providing such power arrangements, as can be seen from FIGS. 8A and 8B, various aberrations such as a spherical aberration, a coma aberration, field curvature, and distortion are appropriately corrected without strengthening the power arrangement of the retro focus type too much.

In addition, disposing the third lens unit L3 for the focusing adjacent to the final lens unit, instead of disposing it at the object side of the zoom lens OL, an effective diameter of this lens unit is reduced around 13 mm, and thus the weight is further reduced. According to the position of the third lens unit L3 and the appropriate power arrangement, the change of the image magnification caused by the focusing can also be suppressed. As a result, a longest total lens length is small of 90.3 mm (the telephoto end) and also the change of the image magnification caused by the focusing is small, and thus high speed focusing can be easily performed since the third lens unit L3 is small and lightweight.

Embodiment 5

Figure 9:
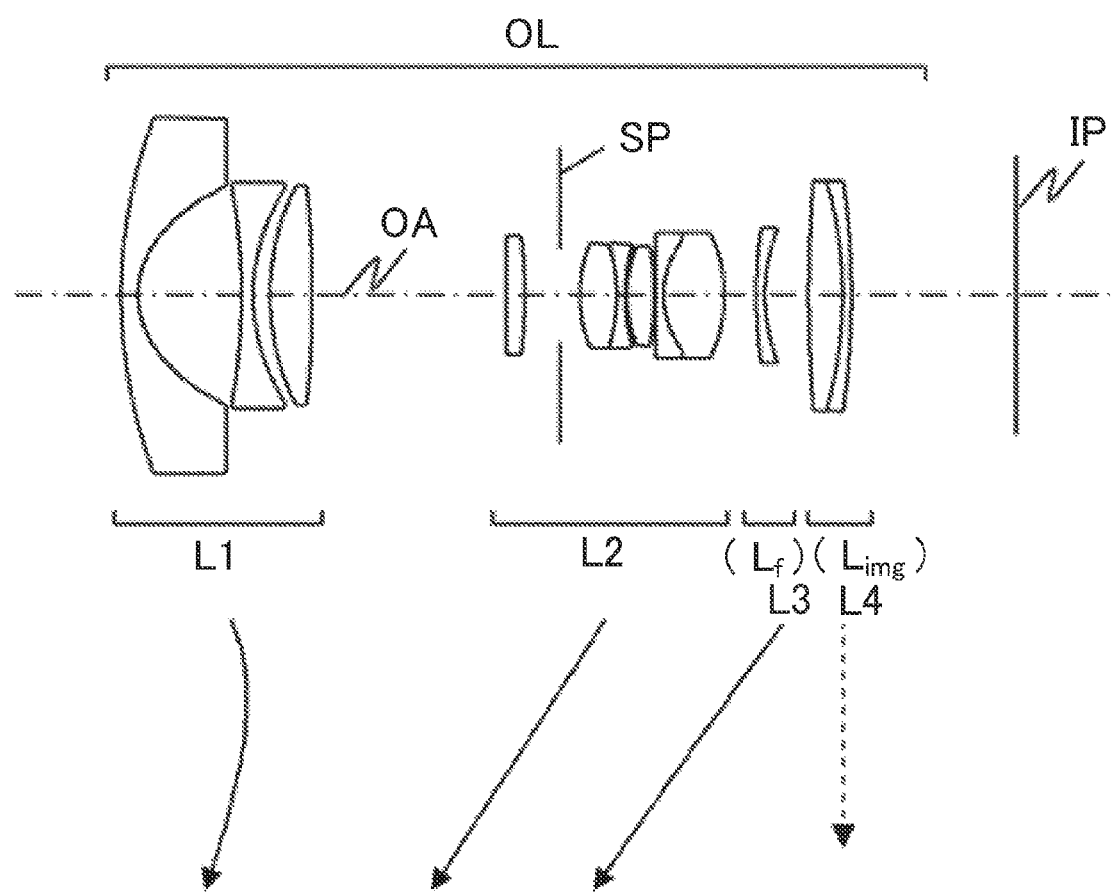
FIG. 9 is a cross-sectional diagram of lenses of a zoom lens at a wide-angle end in Embodiment 5.
Figure 10A:
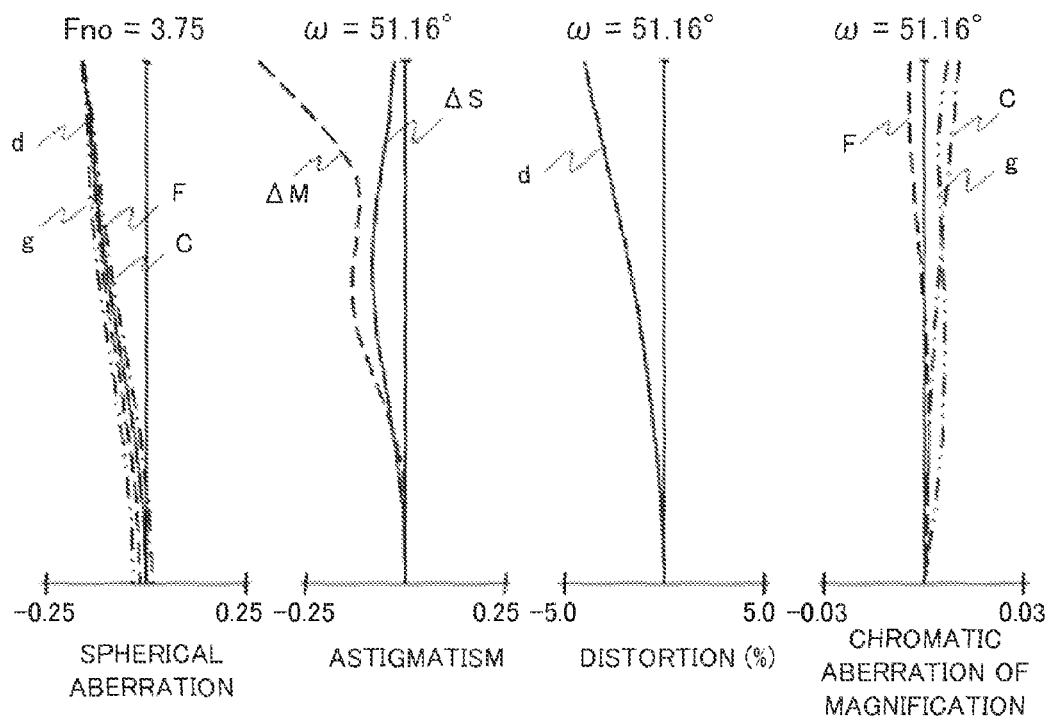
FIGS. 10A and 10B are vertical aberration diagrams of the zoom lens when focusing on an object at infinity in Embodiment 5.
Figure 10B:
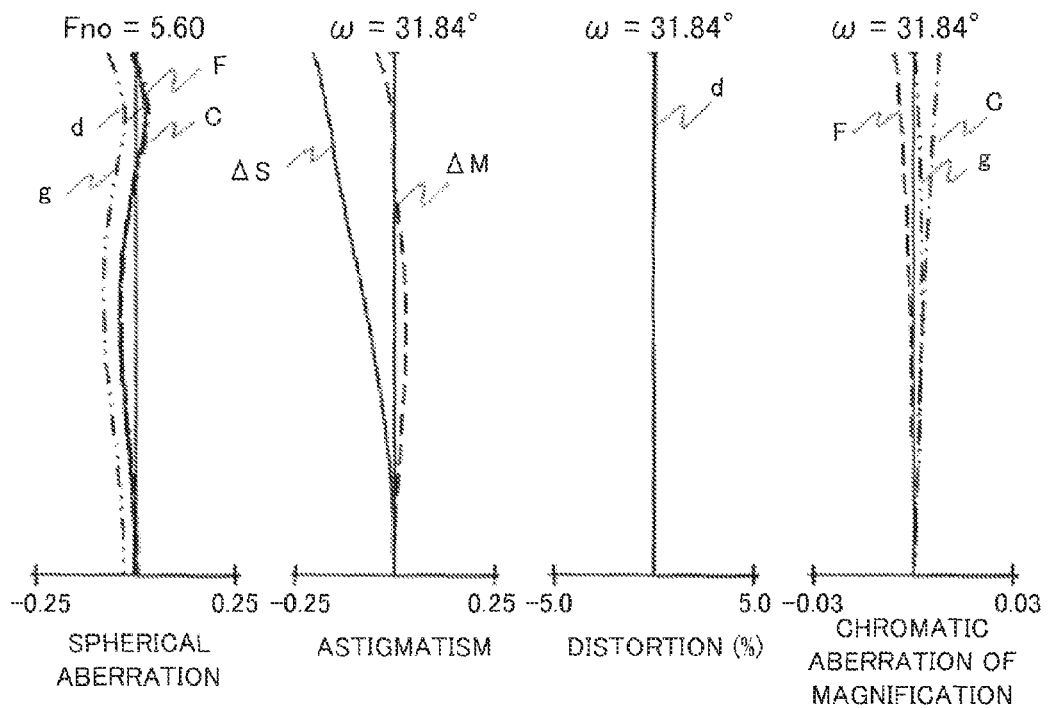

Hereinafter, referring to FIG. 9, a zoom lens OL of Embodiment 5 of the present invention will be described. The zoom lens OL of Embodiment 5 is a zoom lens with a wide angle of field having a focal length of 11.0 mm to 22.0 mm (a shooting angle of field of 102.3 to 63.7 degrees). A type of zooming of the zoom lens of Embodiment 5 is the same as that of Embodiment 1. The lens configuration of the third lens unit L3 for the focusing is also the same as that of Embodiment 1. The focal length of the entire system at the wide-angle end is 11.0 mm. The focal lengths of the third lens unit L3 and the fourth lens unit L4 are −31.21 mm and 234.23 mm, respectively.

In the present embodiment, the absolute value indicated by Conditional Expression (1) is 7.50, and the value indicated by Conditional Expression (2) is 21.29.

The zoom lens of Embodiment 5 achieves a zoom lens with a wide angle of field where the power arrangement as described above is provided and an angle of field 2ω is 102.3 degrees at the wide-angle end. Providing such power arrangements, as can be seen from FIGS. 10A and 10B, various aberrations such as a spherical aberration, a coma aberration, field curvature, and distortion are appropriately corrected without strengthening the power arrangement of the retro focus type too much.

In addition, disposing the third lens unit L3 for the focusing adjacent to the final lens unit, instead of disposing it at the object side of the zoom lens OL, an effective diameter of this lens unit is reduced around 13 mm, and thus the weight is further reduced. According to the position of the third lens unit L3 and the appropriate power arrangement, the change of the image magnification caused by the focusing can also be suppressed. As a result, a longest total lens length is small of 90.3 mm (the telephoto end) and also the change of the image magnification caused by the focusing is small, and thus high speed focusing can be easily performed since the third lens unit L3 is small and lightweight.

Embodiment 6

Figure 11:
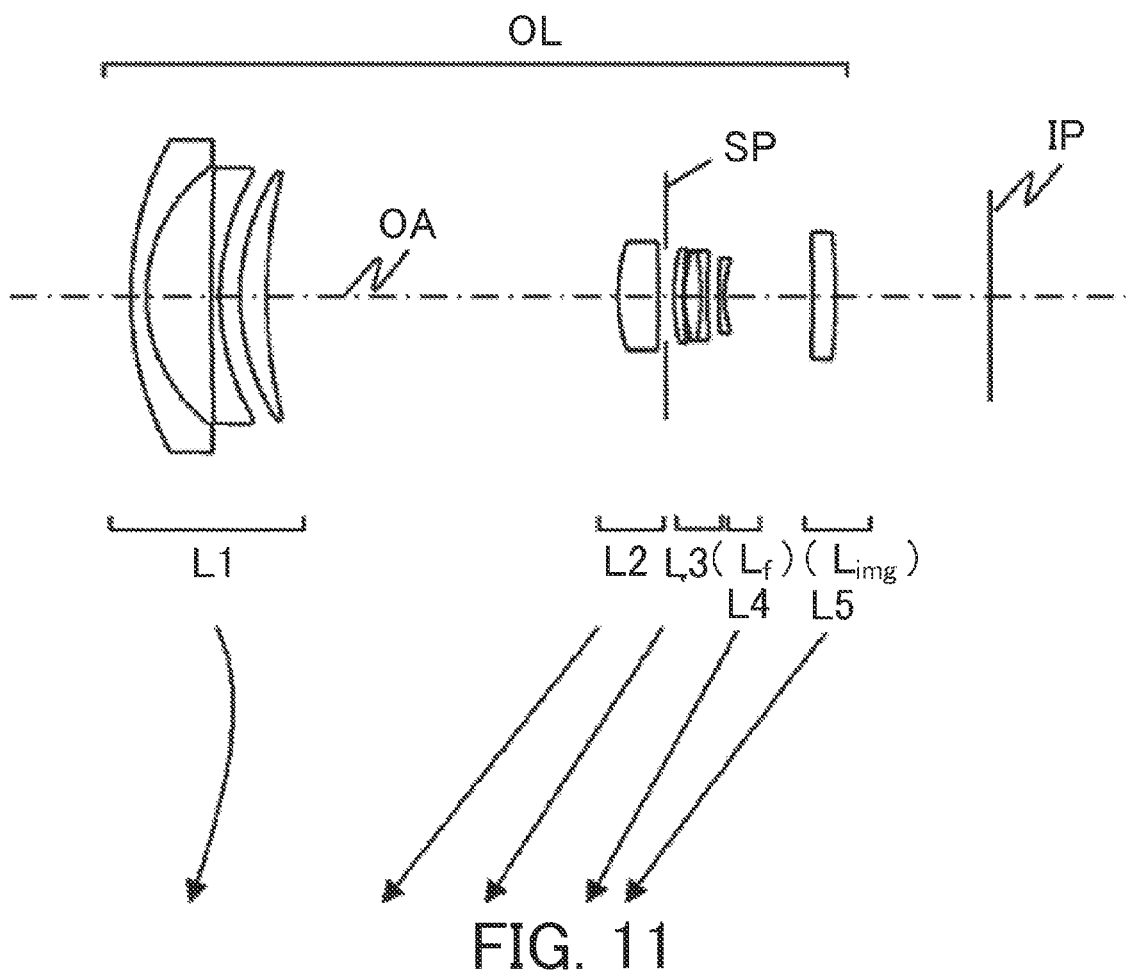
FIG. 11 is a cross-sectional diagram of lenses of a zoom lens at a wide-angle end in Embodiment 6.
Figure 12A:
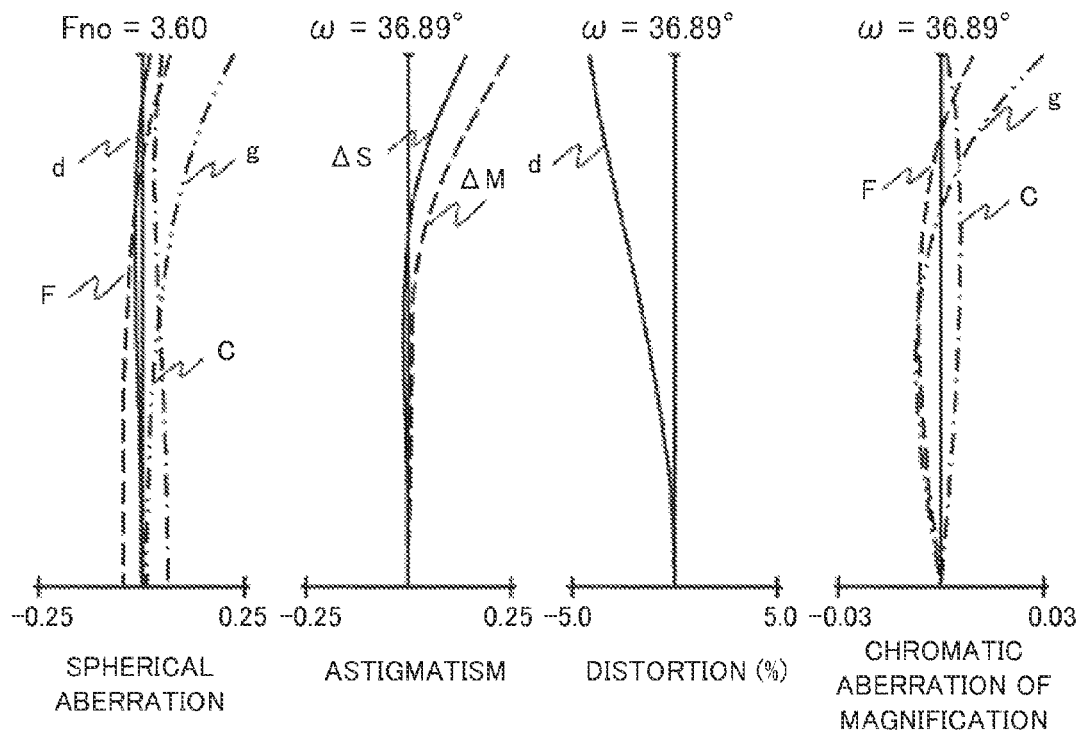
FIGS. 12A and 12B are vertical aberration diagrams of the zoom lens when focusing on an object at infinity in Embodiment 6.
Figure 12B:
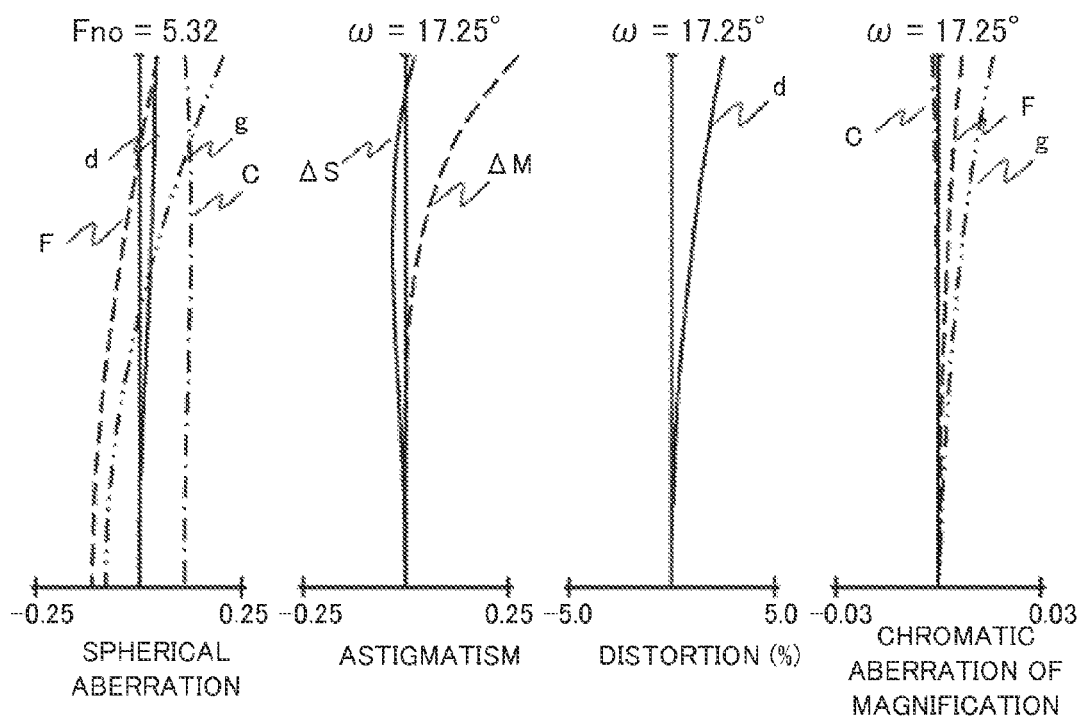

Hereinafter, referring to FIG. 11, a zoom lens OL of Embodiment 6 of the present invention will be described. The zoom lens OL of Embodiment 6 is a zoom lens with a wide angle of field having a focal length of 18.2 mm to 44.0 mm (a shooting angle of field of 73.8 to 34.5 degrees). The zoom lens OL is configured by a first lens unit L1 having a negative refractive power, a second lens unit L2 having a positive refractive power, a third lens unit L3 having a positive refractive power, a fourth lens unit L4 having a negative refractive power, and a fifth lens unit L5 having a positive refractive power.

In this zoom lens OL, the fifth lens unit L5 is the final lens unit ($L_{img}$). The fourth lens unit L4 is the focus lens unit ($L_f$) that moves to the image side along the optical axis in focusing on the object at infinity to the object at the short distance. This focus lens unit ($L_f$) is configured by a negative lens having a meniscus shape concave towards the image side. The focal length of the entire system at the wide-angle end is 18.2 mm. The focal lengths of the fourth lens unit L4 and the fifth lens unit L5 are −29.44 mm and 95.26 mm, respectively.

In the present embodiment, the absolute value indicated by Conditional Expression (1) is 3.24, and the value indicated by Conditional Expression (2) is 5.23.

The zoom lens of Embodiment 6 achieves a zoom lens with a wide angle of field where the power arrangement as described above is provided and an angle of field 2ω is 73.8 degrees at the wide-angle end. Providing such power arrangements, as can be seen from FIGS. 12A and 12B, various aberrations such as a spherical aberration, a coma aberration, field curvature, and distortion are appropriately corrected without strengthening the power arrangement of the retro focus type too much.

In addition, disposing the fourth lens unit L4 for the focusing adjacent to the final lens unit, instead of disposing it at the object side of the zoom lens OL, an effective diameter of this lens unit is reduced around 9 mm, and thus the weight is further reduced. According to the position of the fourth lens unit L4 and the appropriate power arrangement, the change of the image magnification caused by the focusing can also be suppressed. As a result, a longest total lens length is small of 110.00 mm (the wide-angle end) and also the change of the image magnification caused by the focusing is small, and thus high speed focusing can be easily performed since the fourth lens unit L4 is small and lightweight.

FIG. 13 is a schematic diagram of a main part of a single-lens reflex camera. In FIG. 13, reference numeral 10 denotes an image pickup optical system having the zoom lens 1 of each of Embodiments 1 to 6. The image pickup optical system 1 is held on a barrel 2 that is a holding member. Reference numeral 20 denotes a camera body. The camera body 20 is configured by a quick return mirror 3, a focusing glass 4, a penta dach prism 5, an eyepiece lens 6, and the like.

The quick return mirror 3 reflects a light beam from the image pickup optical system 10 upwardly. The focusing glass 4 is disposed at an image forming position of the image pickup optical system 10. The penta dach prism 5 converts an inverse image formed on the focusing glass 4 into an erected image. A user observes the erected image via the eyepiece lens 6. Reference numeral 7 denotes a photo-sensitive surface, and a solid-state image pickup element (a photoelectric conversion element) such as a CCD sensor or a CMOS sensor that receives light of an image or a silver-salt film is disposed on the photo-sensitive surface 7. At the time of taking an image, the quick return mirror 3 is removed from an optical path and an image is formed on the photo-sensitive surface 7 by the image pickup optical system 10.

Thus, applying the zoom lens of the present invention to the image pickup apparatus such as a single-lens reflex camera or an interchangeable lens, an optical apparatus with a high optical performance is achieved.

Similarly, the zoom lens of the present invention can also be applied to a mirrorless single-lens reflex camera that does not have the quick return mirror. The zoom lens of the present invention can also be applied to an optical device such as a telescope, binoculars, or a projector, as well as the digital camera, the video camera, or the silver-salt film camera.

Hereinafter, specific numerical data of Numerical examples 1 to 6 that correspond to Embodiments 1 to 6, respectively, are indicated. Symbol i denotes an order of a surface counted from the object side. Symbol Ri denotes a radius of curvature (mm), and Symbol Di denotes a surface distance (mm) between an i-th surface and an (i+1)-th surface. Symbols Ndi and νdi denote a refractive index and Abbe's number of the medium between the i-th surface and the (i+1)-th surface for the d-line, respectively. Symbol BF denotes a back focus. A total lens length represents a distance from a first lens surface to an image plane.

An aspherical surface is represented by adding symbol * behind the surface number. An aspherical surface shape is represented by the following expression, where symbol X is a displacement from an apex of a surface in an optical axis direction, symbol h is a height from the optical axis in a direction perpendicular to the optical axis, symbol r is a paraxial radius of curvature, symbol K is a conic constant, and symbols B, C, D, E, . . . are aspherical coefficients of respective orders.

$$x(h) = \frac{(1/r)h^2}{1 + \sqrt{\{1 - (1+K)(h/r)^2\}}} + Bh^4 + Ch^6 + Dh^8 + Eh^{10}$$

The description of "E±xx" for each aspherical coefficient means "×10$^{\pm xx}$". Table 1 indicates a numerical value related to each conditional expression described above. Table 2 indicates a numerical value that corresponds to each conditional expression described above.

Numerical Example 1

Unit mm

| Surface Number | R | D | Nd | vd | Effective diameter |
|---|---|---|---|---|---|
| 1 | 30.452 | 2.30 | 1.77250 | 49.6 | 30.34 |
| 2* | 8.896 | 8.59 | | | 20.18 |
| 3 | −64.867 | 1.20 | 1.77250 | 49.6 | 19.74 |
| 4 | 19.876 | 2.78 | | | 18.43 |
| 5 | 25.154 | 3.91 | 1.73800 | 32.3 | 19.02 |
| 6 | −83.477 | (variable) | | | 18.71 |
| 7 | −94.280 | 1.21 | 1.83400 | 37.2 | 9.22 |
| 8 | −36.820 | 3.50 | | | 9.36 |
| 9(stop) | ∞ | 2.00 | | | 9.64 |
| 10 | 12.993 | 4.68 | 1.51823 | 58.9 | 9.98 |
| 11 | −10.954 | 0.80 | 1.83400 | 37.2 | 9.43 |
| 12 | 19.514 | 0.40 | | | 9.43 |
| 13 | 13.843 | 4.02 | 1.48749 | 70.2 | 9.74 |
| 14 | −13.973 | 0.15 | | | 10.33 |
| 15 | −63.398 | 3.49 | 1.76182 | 26.5 | 10.49 |
| 16 | −8.985 | 0.80 | 1.83400 | 37.2 | 10.80 |
| 17 | −25.030 | 0.15 | | | 11.23 |
| 18 | 30.854 | 5.63 | 1.49700 | 81.5 | 11.24 |
| 19 | −8.100 | 0.80 | 1.88300 | 40.8 | 10.90 |
| 20 | −43.415 | (variable) | | | 11.59 |
| 21 | 62.117 | 0.80 | 1.83400 | 37.2 | 12.13 |
| 22 | 16.329 | (variable) | | | 12.23 |
| 23 | 50.797 | 2.55 | 1.48749 | 70.2 | 19.34 |
| 24 | −419.766 | (variable) | | | 20.01 |
| Image plane | ∞ | | | | |

Aspherical surface data

| | Conic constant K | 4th coefficient B | 6th coefficient C |
|---|---|---|---|
| 2nd surface | −4.7384E−01 | 7.3430E−06 | −1.2623E−07 |

| | 8th coefficient D | 10th coefficient E |
|---|---|---|
| 2nd surface | 1.8138E−09 | −9.1816E−12 |

| Various kinds of data | Wide-angle end | Middle | Telephoto end |
|---|---|---|---|
| Focal length | 11.00 | 15.50 | 22.00 |
| Fno | 4.00 | 4.60 | 5.60 |
| Half angle of field ω (degree) | 51.16 | 41.39 | 31.84 |
| Image height | 13.66 | 13.66 | 13.66 |
| Total lens length | 90.36 | 85.76 | 87.31 |
| BF | 11.06 | 16.81 | 25.49 |
| Entrance pupil position | 12.53 | 11.56 | 10.61 |
| Exit pupil position | −25.36 | −24.91 | −24.74 |
| Front side principal point position | 20.21 | 21.30 | 22.97 |
| Rear side principal point position | 0.06 | 1.31 | 3.49 |

Variable distance

| Surface number | Wide-angle end | Middle | Telephoto end |
|---|---|---|---|
| 6 | 20.48 | 10.13 | 3.00 |
| 20 | 1.30 | 1.73 | 1.90 |
| 22 | 7.77 | 7.34 | 7.17 |
| 24 | 11.06 | 16.81 | 25.49 |

Unit data

| Unit | Start surface | focal length | Lens configuration length | Front side principal point position | Rear side principal point position |
|---|---|---|---|---|---|
| 1 | 1 | −16.33 | 18.77 | 0.75 | −17.57 |
| 2 | 7 | 18.63 | 27.64 | 8.13 | −12.46 |
| 3 | 21 | −26.77 | 0.80 | 0.60 | 0.16 |
| 4 | 23 | 93.12 | 2.55 | 0.19 | −1.53 |

Single lens data

| Lens | Start surface | Focal length |
|---|---|---|
| 1 | 1 | −17.060 |
| 2 | 3 | −19.570 |
| 3 | 5 | 26.600 |
| 4 | 7 | 71.750 |
| 5 | 10 | 12.290 |
| 6 | 11 | −8.310 |
| 7 | 13 | 14.970 |
| 8 | 15 | 13.370 |
| 9 | 16 | −17.200 |
| 10 | 18 | 13.560 |
| 11 | 19 | −11.400 |
| 12 | 21 | −26.770 |
| 13 | 23 | 93.120 |

Numerical Example 2

Unit mm

| Surface Number | R | D | Nd | vd | Effective diameter |
|---|---|---|---|---|---|
| 1 | 24.756 | 1.50 | 1.88300 | 40.8 | 31.54 |
| 2 | 13.493 | 3.34 | | | 24.41 |
| 3 | 15.534 | 1.80 | 1.58313 | 59.4 | 23.50 |
| 4* | 7.468 | 9.77 | | | 18.53 |
| 5 | −31.870 | 1.20 | 1.58913 | 61.1 | 17.96 |
| 6 | 33.804 | 0.15 | | | 17.75 |
| 7 | 23.445 | 3.93 | 1.73800 | 32.3 | 17.93 |
| 8 | −102.949 | (variable) | | | 17.55 |
| 9 | −88.715 | 1.43 | 1.77250 | 49.6 | 9.53 |
| 10 | −34.817 | 3.57 | | | 9.77 |
| 11(stop) | ∞ | 1.91 | | | 10.26 |
| 12 | 16.496 | 4.12 | 1.59551 | 39.2 | 10.62 |
| 13 | −12.959 | 0.80 | 1.83400 | 37.2 | 10.24 |
| 14 | 24.029 | 1.59 | | | 10.15 |
| 15 | 14.291 | 4.62 | 1.49700 | 81.5 | 10.90 |
| 16 | −24.473 | 0.15 | | | 11.57 |
| 17 | 35.328 | 0.80 | 1.88300 | 40.8 | 11.73 |
| 18 | 10.947 | 3.83 | 1.56384 | 60.7 | 11.54 |
| 19 | −48.946 | 0.13 | | | 11.79 |

-continued

Unit mm

| | | | | | |
|---|---|---|---|---|---|
| 20 | 63.696 | 5.40 | 1.60342 | 38.0 | 11.85 |
| 21 | −8.216 | 0.80 | 1.88300 | 40.8 | 11.80 |
| 22 | −46.523 | (variable) | | | 12.58 |
| 23 | 29.911 | 0.70 | 1.91082 | 35.3 | 13.30 |
| 24 | 16.324 | (variable) | | | 13.19 |
| 25 | 62.139 | 2.85 | 1.58313 | 59.4 | 19.88 |
| 26* | 93.393 | (variable) | | | 20.70 |
| Image plane | ∞ | | | | |

Aspherical surface data

| | Conic constant K | 4th coefficient B | 6th coefficient C |
|---|---|---|---|
| 4th surface | −9.5172E−01 | 1.2862E−04 | 2.0642E−07 |
| 26th surface | 0.0000E+00 | −2.3175E−06 | −8.8498E−08 |

| | 8th coefficient D | 10th coefficient E |
|---|---|---|
| 4th surface | 7.9480E−09 | −3.1156E−11 |
| 26th surface | 6.6362E−10 | −2.5916E−12 |

| Various kinds of data | Wide-angle end | Middle | Telephoto end |
|---|---|---|---|
| Focal length | 12.03 | 17.00 | 23.66 |
| Fno | 4.00 | 4.69 | 5.60 |
| Half angle of field ω (degree) | 48.63 | 38.78 | 30.00 |
| Image height | 13.66 | 13.66 | 13.66 |
| Total lens length | 94.79 | 92.90 | 95.73 |
| BF | 10.99 | 17.95 | 26.98 |
| Entrance pupil position | 14.68 | 13.78 | 12.92 |
| Exit pupil position | −25.93 | −25.96 | −25.83 |
| Front side principal point position | 22.79 | 24.20 | 25.98 |
| Rear side principal point position | −1.04 | 0.95 | 3.32 |

Variable distance

| Surface number | Wide-angle end | Middle | Telephoto end |
|---|---|---|---|
| 8 | 18.54 | 9.70 | 3.50 |
| 22 | 1.49 | 1.44 | 1.64 |
| 24 | 9.38 | 9.43 | 9.22 |
| 26 | 10.99 | 17.95 | 26.98 |

Unit data

| Unit | Start surface | focal length | Lens configuration length | Front side principal point position | Rear side principal point position |
|---|---|---|---|---|---|
| 1 | 1 | −16.22 | 21.68 | 3.19 | −16.28 |
| 2 | 9 | 20.05 | 29.16 | 8.92 | −13.33 |
| 3 | 23 | −40.45 | 0.70 | 0.83 | 0.45 |
| 4 | 25 | 308.10 | 2.85 | −3.46 | −5.20 |

Single lens data

| Lens | Start surface | Focal length |
|---|---|---|
| 1 | 1 | −35.820 |
| 2 | 3 | −26.870 |
| 3 | 5 | −27.660 |
| 4 | 7 | 26.220 |
| 5 | 9 | 73.340 |
| 6 | 12 | 12.860 |
| 7 | 13 | −10.000 |
| 8 | 15 | 18.900 |
| 9 | 17 | −18.250 |
| 10 | 18 | 16.240 |

-continued

Unit mm

| | | |
|---|---|---|
| 11 | 20 | 12.410 |
| 12 | 21 | −11.410 |
| 13 | 23 | −40.450 |
| 14 | 25 | 308.100 |

Numerical Example 3

Unit mm

| Surface Number | R | D | Nd | vd | Effective diameter |
|---|---|---|---|---|---|
| 1* | 50.214 | 2.30 | 1.58313 | 59.4 | 32.10 |
| 2* | 8.890 | 9.13 | | | 20.52 |
| 3 | −43.823 | 1.20 | 1.77250 | 49.6 | 19.85 |
| 4 | 16.692 | 2.56 | | | 18.10 |
| 5 | 24.841 | 3.70 | 1.91082 | 35.3 | 18.76 |
| 6 | −110.630 | (variable) | | | 18.47 |
| 7 | −130.232 | 1.28 | 1.69680 | 55.5 | 9.09 |
| 8 | −36.876 | 3.50 | | | 9.23 |
| 9(stop) | ∞ | 2.00 | | | 9.62 |
| 10 | 11.211 | 4.49 | 1.51742 | 52.4 | 10.00 |
| 11 | −14.765 | 0.80 | 1.88300 | 40.8 | 9.35 |
| 12 | 14.950 | 0.40 | | | 9.19 |
| 13 | 11.819 | 4.14 | 1.53172 | 48.8 | 9.50 |
| 14 | −17.101 | 0.67 | | | 10.23 |
| 15 | 31.522 | 6.71 | 1.49700 | 81.5 | 10.51 |
| 16 | −7.227 | 0.67 | 1.85400 | 40.4 | 10.44 |
| 17* | −26.546 | (variable) | | | 11.29 |
| 18 | 43.166 | 0.80 | 1.83400 | 37.2 | 12.11 |
| 19 | 18.139 | (variable) | | | 12.20 |
| 20 | 62.546 | 6.85 | 1.62588 | 35.7 | 16.56 |
| 21 | −12.150 | 1.00 | 1.83481 | 42.7 | 17.50 |
| 22 | −50.363 | (variable) | | | 19.50 |
| Image plane | ∞ | | | | |

Aspherical surface data

| | Conic constant K | 4th coefficient B | 6th coefficient C |
|---|---|---|---|
| 1st surface | 0.0000E+00 | 2.2514E−05 | −6.3808E−08 |
| 2nd surface | −4.7832E−01 | 9.5239E−06 | −6.2835E−08 |
| 17th surface | 0.0000E+00 | 2.6963E−05 | 3.6258E−07 |

| | 8th coefficient D | 10th coefficient E |
|---|---|---|
| 1st surface | 4.2156E−11 | 1.4451E−13 |
| 2nd surface | 2.4304E−09 | −4.1669E−11 |
| 17th surface | −5.2493E−09 | 1.9541E−10 |

| Various kinds of data | Wide-angle end | Middle | Telephoto end |
|---|---|---|---|
| Focal length | 11.00 | 15.50 | 22.00 |
| Fno | 4.00 | 4.63 | 5.60 |
| Half angle of field ω (degree) | 51.16 | 41.39 | 31.84 |
| Image height | 13.66 | 13.66 | 13.66 |
| Total lens length | 89.99 | 86.41 | 88.30 |
| BF | 11.04 | 17.16 | 26.00 |
| Entrance pupil position | 12.79 | 11.87 | 10.93 |
| Exit pupil position | −25.50 | −25.33 | −25.17 |
| Front side principal point position | 20.48 | 21.71 | 23.47 |
| Rear side principal point position | 0.04 | 1.66 | 4.00 |

-continued

Unit mm

Variable distance

| Surface number | Wide-angle end | Middle | Telephoto end |
|---|---|---|---|
| 6 | 19.65 | 9.95 | 3.00 |
| 17 | 1.30 | 1.53 | 1.75 |
| 19 | 5.78 | 5.55 | 5.33 |
| 22 | 11.04 | 17.16 | 26.00 |

Unit data

| Unit | Start surface | focal length | Lens configuration length | Front side principal point position | Rear side principal point position |
|---|---|---|---|---|---|
| 1 | 1 | −16.02 | 18.89 | 1.27 | −16.90 |
| 2 | 7 | 19.48 | 24.67 | 6.45 | −12.34 |
| 3 | 18 | −38.07 | 0.80 | 0.76 | 0.32 |
| 4 | 20 | 105.57 | 7.85 | 0.75 | −4.08 |

Single lens data

| Lens | Start surface | Focal length |
|---|---|---|
| 1 | 1 | −18.910 |
| 2 | 3 | −15.510 |
| 3 | 5 | 22.570 |
| 4 | 7 | 73.410 |
| 5 | 10 | 13.090 |
| 6 | 11 | −8.310 |
| 7 | 13 | 13.830 |
| 8 | 15 | 12.550 |
| 9 | 16 | −11.820 |
| 10 | 18 | −38.070 |
| 11 | 20 | 16.850 |
| 12 | 21 | −19.410 |

Numerical Example 4

Unit mm

| Surface Number | R | D | Nd | vd | Effective diameter |
|---|---|---|---|---|---|
| 1 | 34.122 | 1.60 | 1.58313 | 59.4 | 31.19 |
| 2* | 8.028 | 9.42 | | | 19.95 |
| 3 | −71.877 | 1.20 | 1.77250 | 49.6 | 19.48 |
| 4 | 17.965 | 2.39 | | | 17.94 |
| 5 | 22.361 | 3.69 | 1.80000 | 29.8 | 18.39 |
| 6 | −196.840 | (variable) | | | 17.99 |
| 7 | −118.088 | 1.92 | 1.48749 | 70.2 | 10.90 |
| 8 | −27.338 | 3.50 | | | 10.81 |
| 9(stop) | ∞ | 2.00 | | | 9.54 |
| 10 | 13.335 | 7.54 | 1.48749 | 70.2 | 10.78 |
| 11 | −15.343 | 0.80 | 1.83400 | 37.2 | 9.63 |
| 12 | 26.144 | 0.15 | | | 9.56 |
| 13 | 11.701 | 3.99 | 1.49700 | 81.5 | 10.36 |
| 14 | −17.985 | 0.15 | | | 10.79 |
| 15 | −84.127 | 5.08 | 1.74077 | 27.8 | 10.81 |
| 16 | −8.398 | 0.80 | 1.85400 | 40.4 | 11.02 |
| 17* | −59.178 | (variable) | | | 11.47 |
| 18 | 146.634 | 0.80 | 1.83400 | 37.2 | 13.30 |
| 19 | 23.749 | (variable) | | | 13.66 |
| 20 | 24.648 | 5.30 | 1.48749 | 70.2 | 18.30 |
| 21 | −29.395 | 0.80 | 1.83400 | 37.2 | 18.93 |
| 22 | −199.614 | (variable) | | | 19.75 |
| Image plane | ∞ | | | | |

-continued

Unit mm

Aspherical surface data

| | Conic constant K | 4th coefficient B | 6th coefficient C |
|---|---|---|---|
| 2nd surface | −5.4449E−01 | 6.5936E−06 | 1.3705E−08 |
| 17th surface | 0.0000E+00 | 1.5302E−04 | 1.3290E−06 |

| | 8th coefficient D | 10th coefficient E |
|---|---|---|
| 2nd surface | 8.5783E−11 | 9.8148E−12 |
| 17th surface | 4.4175E−09 | 2.4817E−10 |

| Various kinds of data | Wide-angle end | Middle | Telephoto end |
|---|---|---|---|
| Focal length | 11.00 | 15.50 | 22.00 |
| Fno | 3.78 | 4.49 | 5.60 |
| Half angle of field ω (degree) | 51.16 | 41.39 | 31.84 |
| Image height | 13.66 | 13.66 | 13.66 |
| Total lens length | 87.38 | 85.14 | 90.28 |
| BF | 11.27 | 17.83 | 28.86 |
| Entrance pupil position | 12.41 | 11.51 | 10.69 |
| Exit pupil position | −23.42 | −24.00 | −25.56 |
| Front side principal point position | 19.93 | 21.27 | 23.80 |
| Rear side principal point position | 0.27 | 2.33 | 6.86 |

Variable distance

| Surface number | Wide-angle end | Middle | Telephoto end |
|---|---|---|---|
| 6 | 17.69 | 8.89 | 3.00 |
| 17 | 3.66 | 3.02 | 1.30 |
| 19 | 3.62 | 4.26 | 5.98 |
| 22 | 11.27 | 17.83 | 28.86 |

Unit data

| Unit | Start surface | focal length | Lens configuration length | Front side principal point position | Rear side principal point position |
|---|---|---|---|---|---|
| 1 | 1 | −16.23 | 18.30 | 0.95 | −16.42 |
| 2 | 7 | 19.93 | 25.93 | 8.43 | −12.09 |
| 3 | 18 | −34.08 | 0.80 | 0.52 | 0.08 |
| 4 | 20 | 78.81 | 6.10 | −1.99 | −5.86 |

Single lens data

| Lens | Start surface | Focal length |
|---|---|---|
| 1 | 1 | −18.420 |
| 2 | 3 | −18.500 |
| 3 | 5 | 25.290 |
| 4 | 7 | 72.470 |
| 5 | 10 | 16.010 |
| 6 | 11 | −11.490 |
| 7 | 13 | 14.930 |
| 8 | 15 | 12.240 |
| 9 | 16 | −11.540 |
| 10 | 18 | −34.080 |
| 11 | 20 | 28.420 |
| 12 | 21 | −41.420 |

Numerical Example 5

Unit mm

| Surface Number | R | D | Nd | vd | Effective diameter |
|---|---|---|---|---|---|
| 1 | 49.850 | 1.60 | 1.58313 | 59.4 | 33.47 |
| 2* | 8.285 | 10.06 | | | 21.35 |
| 3 | −60.286 | 1.20 | 1.72916 | 54.7 | 20.95 |
| 4 | 19.148 | 1.61 | | | 19.63 |
| 5 | 23.684 | 4.13 | 1.91082 | 35.3 | 20.11 |
| 6 | −122.962 | (variable) | | | 19.75 |
| 7 | 273.075 | 1.79 | 1.80400 | 46.6 | 10.68 |
| 8 | −60.345 | 3.50 | | | 10.39 |
| 9(stop) | ∞ | 2.00 | | | 9.01 |
| 10 | 13.521 | 3.59 | 1.49700 | 81.5 | 9.48 |
| 11 | −16.809 | 0.80 | 1.88300 | 40.8 | 9.05 |
| 12 | 16.281 | 0.15 | | | 8.95 |
| 13 | 13.245 | 2.70 | 1.58313 | 59.4 | 9.10 |
| 14* | −22.565 | 0.15 | | | 9.17 |
| 15 | 438.452 | 0.80 | 1.88300 | 40.8 | 9.44 |
| 16 | 8.948 | 5.97 | 1.66998 | 39.3 | 9.95 |
| 17 | −14.546 | (variable) | | | 11.46 |
| 18 | 57.281 | 0.80 | 1.83400 | 37.2 | 12.43 |
| 19 | 17.781 | (variable) | | | 12.45 |
| 20 | 149.796 | 3.32 | 1.48749 | 70.2 | 20.59 |
| 21 | −38.337 | 0.80 | 1.80000 | 29.8 | 20.97 |
| 22 | −87.392 | (variable) | | | 21.47 |
| Image plane | ∞ | | | | |

Aspherical surface data

| | Conic constant K | 4th coefficient B | 6th coefficient C |
|---|---|---|---|
| 2nd surface | −8.0765E−01 | 4.7393E−05 | 1.2777E−07 |
| 14th surface | 0.0000E+00 | 1.2892E−04 | 1.0224E−07 |

| | 8th coefficient D | 10th coefficient E |
|---|---|---|
| 2nd surface | 9.2378E−10 | 8.0140E−12 |
| 14th surface | −9.3803E−09 | −9.8935E−12 |

Various kinds of data

| | Wide-angle end | Middle | Telephoto end |
|---|---|---|---|
| Focal length | 11.00 | 15.50 | 22.00 |
| Fno | 3.75 | 4.51 | 5.60 |
| Half angle of field ω (degree) | 51.16 | 41.39 | 31.84 |
| Image height | 13.66 | 13.66 | 13.66 |
| Total lens length | 87.43 | 85.83 | 90.30 |
| BF | 16.00 | 16.00 | 16.00 |
| Entrance pupil position | 12.56 | 11.54 | 10.52 |
| Exit pupil position | −22.03 | −32.20 | −48.28 |
| Front side principal point position | 20.38 | 22.05 | 24.99 |
| Rear side principal point position | 5.00 | 0.50 | −6.00 |

Variable distance

| Surface number | Wide-angle end | Middle | Telephoto end |
|---|---|---|---|
| 6 | 18.95 | 9.75 | 3.00 |
| 17 | 3.18 | 2.23 | 1.30 |
| 19 | 4.32 | 12.88 | 25.02 |
| 22 | 16.00 | 16.00 | 16.00 |

Unit data

| Unit | Start surface | Lens focal length | Lens configuration length | Front side principal point position | Rear side principal point position |
|---|---|---|---|---|---|
| 1 | 1 | −18.91 | 18.61 | −0.52 | −18.78 |
| 2 | 7 | 18.02 | 21.45 | 12.31 | −6.95 |
| 3 | 18 | −31.21 | 0.80 | 0.64 | 0.20 |
| 4 | 20 | 234.23 | 4.12 | 1.49 | −1.20 |

Single lens data

| Lens | Start surface | Focal length |
|---|---|---|
| 1 | 1 | −17.280 |
| 2 | 3 | −19.800 |
| 3 | 5 | 22.100 |
| 4 | 7 | 61.620 |
| 5 | 10 | 15.690 |
| 6 | 11 | −9.260 |
| 7 | 13 | 14.720 |
| 8 | 15 | −10.350 |
| 9 | 16 | 9.210 |
| 10 | 18 | −31.210 |
| 11 | 20 | 62.980 |
| 12 | 21 | −86.000 |

Numerical Example 6

Unit mm

| Surface Number | R | D | Nd | vd | Effective diameter |
|---|---|---|---|---|---|
| 1 | 42.192 | 2.00 | 1.83481 | 42.7 | 38.67 |
| 2 | 20.779 | 8.32 | | | 32.20 |
| 3 | 392.860 | 1.10 | 1.77250 | 49.6 | 31.58 |
| 4 | 31.282 | 2.59 | | | 29.87 |
| 5 | 29.503 | 3.38 | 1.84666 | 23.8 | 30.35 |
| 6 | 62.162 | (variable) | | | 29.90 |
| 7 | 21.910 | 5.14 | 1.69680 | 55.5 | 12.85 |
| 8 | −128.457 | (variable) | | | 12.09 |
| 9(stop) | ∞ | 1.00 | | | 11.68 |
| 10 | 26.166 | 1.23 | 1.72916 | 54.7 | 11.11 |
| 11 | 39.285 | 0.12 | | | 10.72 |
| 12 | 19.423 | 2.11 | 1.51633 | 64.1 | 10.49 |
| 13 | −31.921 | 0.80 | 1.84666 | 23.8 | 9.99 |
| 14 | 66.357 | (variable) | | | 9.51 |
| 15 | 143.428 | 0.70 | 1.51633 | 64.1 | 8.78 |
| 16 | 13.723 | (variable) | | | 8.31 |
| 17 | −186.017 | 3.00 | 1.69895 | 30.1 | 13.98 |
| 18* | −49.357 | (variable) | | | 15.11 |
| Image plane | ∞ | 0.00 | | | 0.00 |

-continued

Unit mm

Aspherical surface data

|  | Conic constant K | 4th coefficient B | 6th coefficient C |
|---|---|---|---|
| 18th surface | 0.0000E+00 | 3.4776E−05 | −2.9562E−09 |

|  | 8th coefficient D | 10th coefficient E | 12th coefficient F |
|---|---|---|---|
| 18th surface | 2.6360E−09 | −2.9532E−11 | 1.1023E−13 |

Various kinds of data

| | Wide-angle end | Middle | Telephoto end |
|---|---|---|---|
| Focal length | 18.20 | 24.00 | 44.00 |
| Fno | 3.60 | 3.96 | 5.32 |
| Half angle of field ω (degree) | 36.89 | 29.65 | 17.25 |
| Image height | 13.66 | 13.66 | 13.66 |
| Total lens length | 110.00 | 95.81 | 82.91 |
| BF | 19.77 | 24.93 | 38.25 |
| Entrance pupil position | 26.66 | 23.65 | 16.85 |
| Exit pupil position | −21.88 | −18.22 | −12.86 |
| Front side principal point position | 36.91 | 34.30 | 22.96 |
| Rear side principal point position | 1.57 | 0.93 | −5.75 |

Variable distance

| Surface number | Wide-angle end | Middle | Telephoto end |
|---|---|---|---|
| 6 | 44.97 | 27.86 | 4.75 |
| 8 | 1.00 | 1.07 | 1.32 |
| 14 | 1.50 | 2.04 | 3.71 |
| 16 | 11.26 | 8.41 | 3.39 |
| 18 | 19.77 | 24.93 | 38.25 |

Unit data

| Unit | Start surface | focal length | Lens configuration length | Front side principal point position | Rear side principal point position |
|---|---|---|---|---|---|
| 1 | 1 | −37.32 | 17.39 | 3.61 | −10.72 |
| 2 | 7 | 27.24 | 5.14 | 0.45 | −2.62 |
| 3 | 9 | 69.58 | 5.26 | −2.33 | −5.71 |
| 4 | 15 | −29.44 | 0.70 | 0.51 | 0.05 |
| 5 | 17 | 95.26 | 3.00 | 2.38 | 0.63 |

Single lens data

| Lens | Start surface | Focal length |
|---|---|---|
| 1 | 1 | −51.220 |
| 2 | 3 | −44.060 |
| 3 | 5 | 63.320 |
| 4 | 7 | 27.240 |
| 5 | 10 | 103.370 |
| 6 | 12 | 23.720 |
| 7 | 13 | −25.360 |
| 8 | 15 | −29.440 |
| 9 | 17 | 95.260 |

TABLE 1

NUMERICAL VALUES OF EMBODIMENTS

| | EMBODIMENT | | | | | |
|---|---|---|---|---|---|---|
| | 1 | 2 | 3 | 4 | 5 | 6 |
| $f_1$ | −16.33 | −16.22 | −16.02 | −16.23 | −18.91 | −37.32 |
| $f_2$ | 18.63 | 20.05 | 19.48 | 19.93 | 18.02 | 27.24 |
| $f_f$ | −26.77 | −40.45 | −38.07 | −34.08 | −31.21 | −29.44 |
| $f_{img}$ | 93.12 | 308.10 | 105.57 | 78.81 | 234.23 | 95.26 |
| $f_w$ | 11.00 | 12.03 | 11.00 | 11.00 | 11.00 | 18.20 |
| $BF_w$ | 11.06 | 10.99 | 11.04 | 11.27 | 16.00 | 19.77 |
| $Y_{max}$ | 13.66 | 13.66 | 13.66 | 13.66 | 13.66 | 13.66 |

TABLE 2

CONDITIONAL EXPRESSIONS

| | CONDITIONAL EXPRESSION | EMBODIMENT | | | | | |
|---|---|---|---|---|---|---|---|
| | | 1 | 2 | 3 | 4 | 5 | 6 |
| (1) | $\|f_{img}/f_f\|$ | 3.48 | 7.62 | 2.77 | 2.31 | 7.50 | 3.24 |
| (2) | $f_{img}/f_w$ | 8.47 | 25.61 | 9.60 | 7.16 | 21.29 | 5.23 |
| (3) | $f_f/f_w$ | −2.43 | −3.36 | −3.46 | −3.10 | −2.84 | −1.62 |
| (4) | $BF_w/f_w$ | 1.01 | 0.91 | 1.00 | 1.02 | 1.45 | 1.09 |
| (5) | $BF_w/Y_{max}$ | 0.81 | 0.80 | 0.81 | 0.83 | 1.17 | 1.45 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-168253, filed on Jul. 30, 2012, which is hereby incorporated by reference herein in its entirety.

What is claimed is:

1. A zoom lens comprising:
in order from an object side to an image side,
a first lens unit having a negative refractive power;
a second lens unit having a positive refractive power;
a focus lens unit having a negative refractive power, configured to move in focusing; and
a final lens unit having a positive refractive power, disposed closest to the image side,
wherein the focus lens unit and the final lens unit are disposed so as to be adjacent to each other,
wherein a distance between adjacent lens units changes in zooming, and
wherein the following conditional expressions are satisfied:

$$2.31 \leq |f_{img}/f_f| < 10.0, \text{ and}$$

$$5.0 < f_{img}/f_w < 40.0,$$

where $f_{img}$ is a focal length of the final lens unit, $f_f$ is a focal length of the focus lens unit, and $f_w$ is a focal length of an entire system at a wide-angle end.

2. The zoom lens according to claim 1, wherein the following conditional expression is satisfied:

$$-4.0 < f_f/f_w < 0.0.$$

3. The zoom lens according to claim 1, wherein the following conditional expression is satisfied:

$$BF_w/f_w < 1.5,$$

where $BF_w$ is a back focus at the wide-angle end.

4. The zoom lens according to claim 1, wherein the focus lens unit is configured by a negative lens having a meniscus shape concave towards the image side.

5. The zoom lens according to claim 1,
wherein the zoom lens, in order from the object side to the image side, consists of the first lens unit having the negative refractive power, the second lens unit having the positive refractive power, a third lens unit having a negative refractive power, and a fourth lens unit having a positive refractive power, and
wherein the focus lens unit is the third lens unit and the final lens unit is the fourth lens unit.

6. The zoom lens according to claim 1,
wherein the zoom lens, in order from the object side to the image side, consists of the first lens unit having the negative refractive power, the second lens unit having the positive refractive power, a third lens unit having a positive refractive power, a fourth lens unit having a negative refractive power, and a fifth lens unit having a positive refractive power, and
wherein the focus lens unit is the fourth lens unit and the final lens unit is the fifth lens unit.

7. The zoom lens according to claim 1, wherein an image is formed on an image pickup element.

8. An image pickup apparatus comprising:
a zoom lens; and
an image pickup element configured to receive light of an image formed by the zoom lens,
wherein the zoom lens includes:
in order from an object side to an image side,
a first lens unit having a negative refractive power;
a second lens unit having a positive refractive power;
a focus lens unit having a negative refractive power, configured to move in focusing; and
a final lens unit having a positive refractive power, disposed closest to the image side,
wherein the focus lens unit and the final lens unit are disposed so as to be adjacent to each other,
wherein a distance between adjacent lens units changes in zooming, and
wherein the following conditional expressions are satisfied:

$2.31 \leq |f_{img}/f_f| < 10.0$, and $5.0 < f_{img}/f_w < 40.0$, where $f_{img}$ is a focal length of the final lens unit, $f_f$ is a focal length of the focus lens unit, and $f_w$ is a focal length of an entire system at a wide-angle end.

9. The image pickup apparatus according to claim 8, wherein the following conditional expression is satisfied:

$BF_w/Y_{max} < 1.6$, where $Y_{max}$ is a maximum image height of an image formed on the image pickup element and $BF_w$ is a back focus at the wide-angle end.

10. A zoom lens comprising:
in order from an object side to an image side,
a first lens unit having a negative refractive power;
a second lens unit having a positive refractive power;
a third lens unit having a positive refractive power;
a fourth lens unit having a negative refractive power; and
a fifth lens unit having a positive refractive power,
wherein the fourth lens unit is a focus lens unit, and configured to move in focusing,
wherein a distance between adjacent lens units changes in zooming, and
wherein the following conditional expressions are satisfied:

$1.8 \leq |f_{img}/f_f| < 10.0$, and $5.0 < f_{img}/f_w < 40.0$, where $f_{img}$ is a focal length of the fifth lens unit, $f_f$ is a focal length of the fourth lens unit, and $f_w$ is a focal length of an entire system at a wide-angle end.

* * * * *